US012700142B2

(12) United States Patent
Akhtar et al.

(10) Patent No.: US 12,700,142 B2
(45) Date of Patent: Aug. 4, 2026

(54) GEOMETRY COORDINATE SCALING FOR AI-BASED DYNAMIC POINT CLOUD CODING

(71) Applicant: QUALCOMM Incorporated, San Diego, CA (US)

(72) Inventors: Anique Akhtar, Kansas City, MS (US); Geert Van der Auwera, San Diego, CA (US); Adarsh Krishnan Ramasubramonian, Irvine, CA (US); Marta Karczewicz, San Diego, CA (US); Luong Pham Van, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 18/318,498

(22) Filed: May 16, 2023

(65) Prior Publication Data

US 2023/0377208 A1     Nov. 23, 2023

Related U.S. Application Data

(60) Provisional application No. 63/364,862, filed on May 17, 2022.

(51) Int. Cl.
*G06T 9/00*     (2006.01)
*G06T 3/40*     (2024.01)
*G06T 9/40*     (2006.01)

(52) U.S. Cl.
CPC ............... *G06T 9/002* (2013.01); *G06T 3/40* (2013.01); *G06T 9/40* (2013.01)

(58) Field of Classification Search
CPC ........... G06T 3/40; G06T 9/001; G06T 9/002; G06T 9/40
See application file for complete search history.

(56) References Cited

U.S. PATENT DOCUMENTS

| | | | |
|---|---|---|---|
| 2019/0080483 A1* | 3/2019 | Mammou | ............. G06T 3/4007 |
| 2019/0122393 A1* | 4/2019 | Sinharoy | ................ G06T 15/04 |
| 2020/0021847 A1* | 1/2020 | Kim | ..................... H04N 19/597 |
| 2022/0070493 A1 | 3/2022 | Mammou et al. | |
| 2022/0108486 A1 | 4/2022 | Ramasubramonian et al. | |
| 2022/0180447 A1* | 6/2022 | Kearney | ............... G06N 3/045 |

OTHER PUBLICATIONS

International Search Report and Written Opinion—PCT/US2023/022546—ISA/EPO—Sep. 12, 2023.

(Continued)

*Primary Examiner* — Ming Wu
(74) *Attorney, Agent, or Firm* — QUALCOMM Incorporated; Espartaco Diaz Hidalgo

(57) ABSTRACT

An example device for decoding point cloud data includes a memory configured to store point cloud data; and one or more processors implemented in circuitry and configured to: determine a number of times to upscale a downscaled encoded representation of a point cloud geometry; decode the downscaled encoded representation of the point cloud geometry; upscale the downscaled representation of the point cloud geometry the number of times to form an upscaled representation of the point cloud geometry; and reproduce a point cloud using the upscaled representation of the point cloud geometry.

17 Claims, 15 Drawing Sheets

(56)  References Cited

OTHER PUBLICATIONS

Kim J., et., "[V-PCC] Report on Exploration Experiment 2.1 on 3D Motion Estimation and Compensation in V-PCC", 125. MPEG Meeting, Jan. 14, 2019-Jan. 18, 2019, Marrakech, (Motion Picture Expert Group or ISO/IEC JTC1/SC29/WG11), No. M46237, Jan. 12, 2019, XP030214786, 6 pages.

Wang J., et al., "Multiscale Point Cloud Geometry Compression", 2021 Data Compression Conference (DCC), IEEE, Mar. 23, 2021, XP033912704, pp. 73-82.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

* cited by examiner

GEOMETRY COORDINATE SCALING FOR AI-BASED DYNAMIC POINT CLOUD CODING

This application claims the benefit of U.S. Provisional Application No. 63/364,862, filed May 17, 2022, the entire contents of which are hereby incorporated by reference.

TECHNICAL FIELD

This disclosure relates to point cloud coding, including point cloud encoding and point cloud decoding.

BACKGROUND

A point cloud (PC) is a three-dimensional (3D) data representation of a 3D space. PCs may be used for tasks like extended reality (XR), augmented reality (AR), virtual reality (VR), and mixed reality (MR), autonomous driving, cultural heritage, or the like. PCs are a set of points in 3D space, represented by their 3D coordinates (x, y, z) referred to as the geometry. Each point may also be associated with multiple attributes such as color, normal vectors, or reflectance.

Depending on the target application and the PC acquisition methods, the PC can be categorized into point cloud scenes or point cloud objects. Point cloud scenes may be captured using LiDAR sensors and are often dynamically acquired. Point cloud objects can be further subdivided into static point clouds and dynamic point clouds. A static PC is a single object, whereas a dynamic PC is a time-varying PC where each instance of a dynamic PC is a static PC. Dynamic time-varying PCs may be used in AR/VR, volumetric video streaming, and telepresence and can be generated using 3D models, i.e., CGI, or captured from real-world scenarios using various methods such as multiple cameras with depth sensors surrounding the object. These PCs are dense photo-realistic point clouds that can have a massive amount of points, especially in high precision or large-scale captures (millions of points per frame with up to 60 frames per second (FPS)). Therefore, efficient point cloud compression (PCC) is particularly important to enable practical usage in VR and MR applications.

SUMMARY

In general, this disclosure describes a flexible configuration of the system where rather than employing a fixed three-times downscaled/downsampled representation, a flexible amount of downscaling may be applied. That is, a point cloud encoder and a point cloud decoder may be configured to downscale/upscale point cloud geometry data a variable number of times. The point cloud encoder may signal a value in the point cloud bitstream indicating the number of times the point cloud geometry was downscaled, such that a point cloud decoder can upscale decoded point cloud geometry data by the same factor. The flexible amount of downscaling may obtain better compression depending on the use case, bit requirements, and the type of point cloud. The flexible configuration can be employed for both intra-point cloud compression for static and dynamic point clouds as well as inter-point cloud compression for dynamic point clouds.

In one example, a method of encoding point cloud data includes determining a number of times to downscale a representation of a point cloud geometry; downscaling the representation of the point cloud geometry the number of times to form a downscaled representation of the point cloud geometry; encoding the downscaled representation of the point cloud geometry; and outputting the encoded downscaled representation of the point cloud geometry.

In another example, a device for encoding point cloud data includes a memory configured to store point cloud data; and one or more processors implemented in circuitry and configured to: determine a number of times to downscale a representation of a point cloud geometry; downscale the representation of the point cloud geometry the number of times to form a downscaled representation of the point cloud geometry; encode the downscaled representation of the point cloud geometry; and output the encoded downscaled representation of the point cloud geometry.

In another example, a device for encoding point cloud data includes: means for determining a number of times to downscale a representation of a point cloud geometry; means for downscaling the representation of the point cloud geometry the number of times to form a downscaled representation of the point cloud geometry; means for encoding the downscaled representation of the point cloud geometry; and means for outputting the encoded downscaled representation of the point cloud geometry.

In another example, a method of decoding point cloud data includes: determining a number of times to upscale a downscaled encoded representation of a point cloud geometry; decoding the downscaled encoded representation of the point cloud geometry; upscaling the downscaled representation of the point cloud geometry the number of times to form an upscaled representation of the point cloud geometry; and reproducing a point cloud using the upscaled representation of the point cloud geometry.

In another example, a device for decoding point cloud data includes: a memory configured to store point cloud data; and one or more processors implemented in circuitry and configured to: determine a number of times to upscale a downscaled encoded representation of a point cloud geometry; decode the downscaled encoded representation of the point cloud geometry; upscale the downscaled representation of the point cloud geometry the number of times to form an upscaled representation of the point cloud geometry; and reproduce a point cloud using the upscaled representation of the point cloud geometry.

In another example, a device for decoding point cloud data includes: means for determining a number of times to upscale a downscaled encoded representation of a point cloud geometry; means for decoding the downscaled encoded representation of the point cloud geometry; means for upscaling the downscaled representation of the point cloud geometry the number of times to form an upscaled representation of the point cloud geometry; and means for reproducing a point cloud using the upscaled representation of the point cloud geometry.

The details of one or more examples are set forth in the accompanying drawings and the description below. Other features, objects, and advantages will be apparent from the description, drawings, and claims.

DETAILED DESCRIPTION

Efficient point cloud compression is essential for applications like virtual reality and mixed reality, autonomous driving, and cultural heritage. Point cloud compression for dense dynamic point clouds may be performed using a deep learning network including an encoding unit and a decoding unit. The encoding unit may extract features from the point cloud geometry into a three-times downscaled point cloud geometry with corresponding feature embedding. The three-times downscaled geometry and the corresponding features may be transmitted to the decoding unit. The decoding unit may then hierarchically reconstruct the original point cloud geometry from the downscaled representation using progressive rescaling.

This disclosure describes a flexible configuration of the system, where rather than employing a three-times downscaled/downsampled representation, a flexible amount of downscaling may be applied. The flexible amount of downscaling may obtain better compression depending on the use case, bit requirements, and the type of point cloud. The flexible configuration can be employed for both intra-point cloud compression for static and dynamic point clouds as well as inter-point cloud compression for dynamic point clouds.

Figure 1:
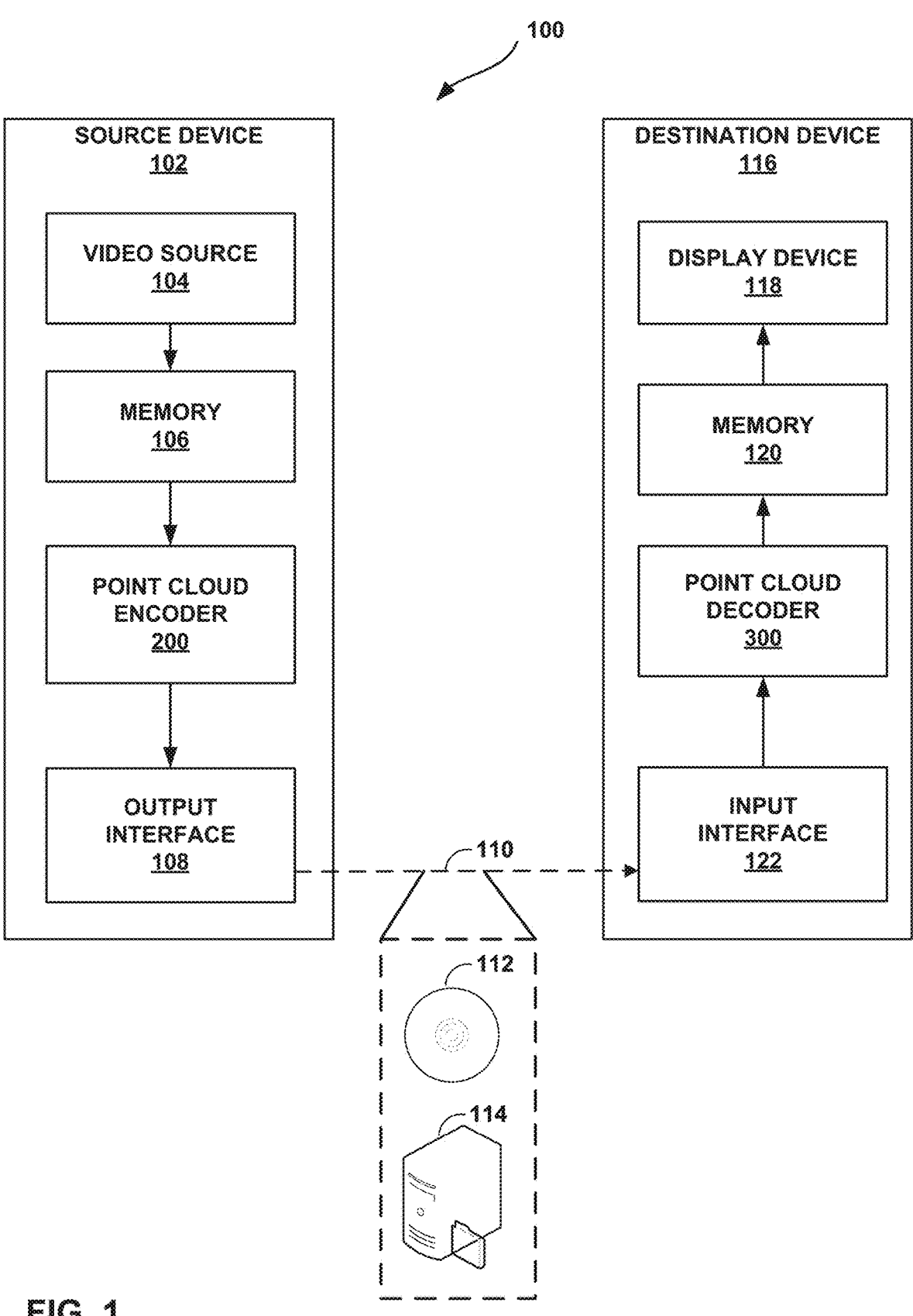
FIG. 1 is a block diagram illustrating an example point cloud encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a point cloud encoder 200, and an output interface 108. Destination device 116 includes an input interface 122, a point cloud decoder 300, a memory 120, and a data consumer 118. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. Source device 102 and destination device 116 are merely examples of such devices in which source device 102 generates coded data for transmission to destination device 116. This disclosure refers to a "coding" device as a device that performs coding (encoding and/or decoding) of data. Thus, point cloud encoder 200 and point cloud decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to point cloud encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Additionally or alternatively, point cloud data may be computer-generated from scanner, camera, sensor or other data. For example, data source 104 may generate computer graphics-based data as the source data, or produce a combination of live data, archived data, and computer-generated data. In each case, point cloud encoder 200 encodes the captured, pre-captured, or computer-generated data. Point cloud encoder 200 may rearrange the frames from the received order (sometimes referred to as "display order") into a coding order for coding. Point cloud encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from point cloud decoder 300. Additionally or alternatively, memory 106 and memory 120 may store software instructions executable by, e.g., point cloud encoder 200 and point cloud decoder 300, respectively. Although memory 106 and memory 120 are shown separately from point cloud encoder 200 and point cloud decoder 300 in this example, it should be understood that point cloud encoder 200 and point cloud decoder 300 may also include internal memories for functionally similar or equivalent purposes. Furthermore, memory 106 and memory 120 may store encoded data, e.g., output from point cloud encoder 200 and input to point cloud decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to point cloud encoder 200 and/or output interface 108, and destination device 116 may include an SoC device to perform the functionality attributed to point cloud decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by point cloud encoder 200, which is also used by point cloud decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

point cloud encoder 200 and point cloud decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of point cloud encoder 200 and point cloud decoder 300 may be included in one or more encoders or decoders, either of which may be integrated as part of a combined encoder/decoder (CODEC) in a respective device. A device including point cloud encoder 200 and/or point cloud decoder 300 may comprise one or more integrated circuits, microprocessors, and/or other types of devices.

point cloud encoder 200 and point cloud decoder 300 may operate according to a coding standard, such as video point cloud compression (V-PCC) standard or a geometry point cloud compression (point cloud) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, point cloud encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (point cloud), which directly compresses 3D geometry i.e., position of a set of points in 3D space, and associated attribute values (for each point associated with the 3D geometry). Point cloud addresses the compression of point clouds in both Category 1 (static point clouds) and Category 3 (dynamically acquired point clouds). A recent draft of the point cloud standard is available in point cloud DIS, ISO/IEC JTC1/SC29/WG11 w19088, Brussels, Belgium, January 2020, and a description of the codec is available in point cloud Codec Description v6, ISO/IEC JTC1/SC29/WG11 w19091, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
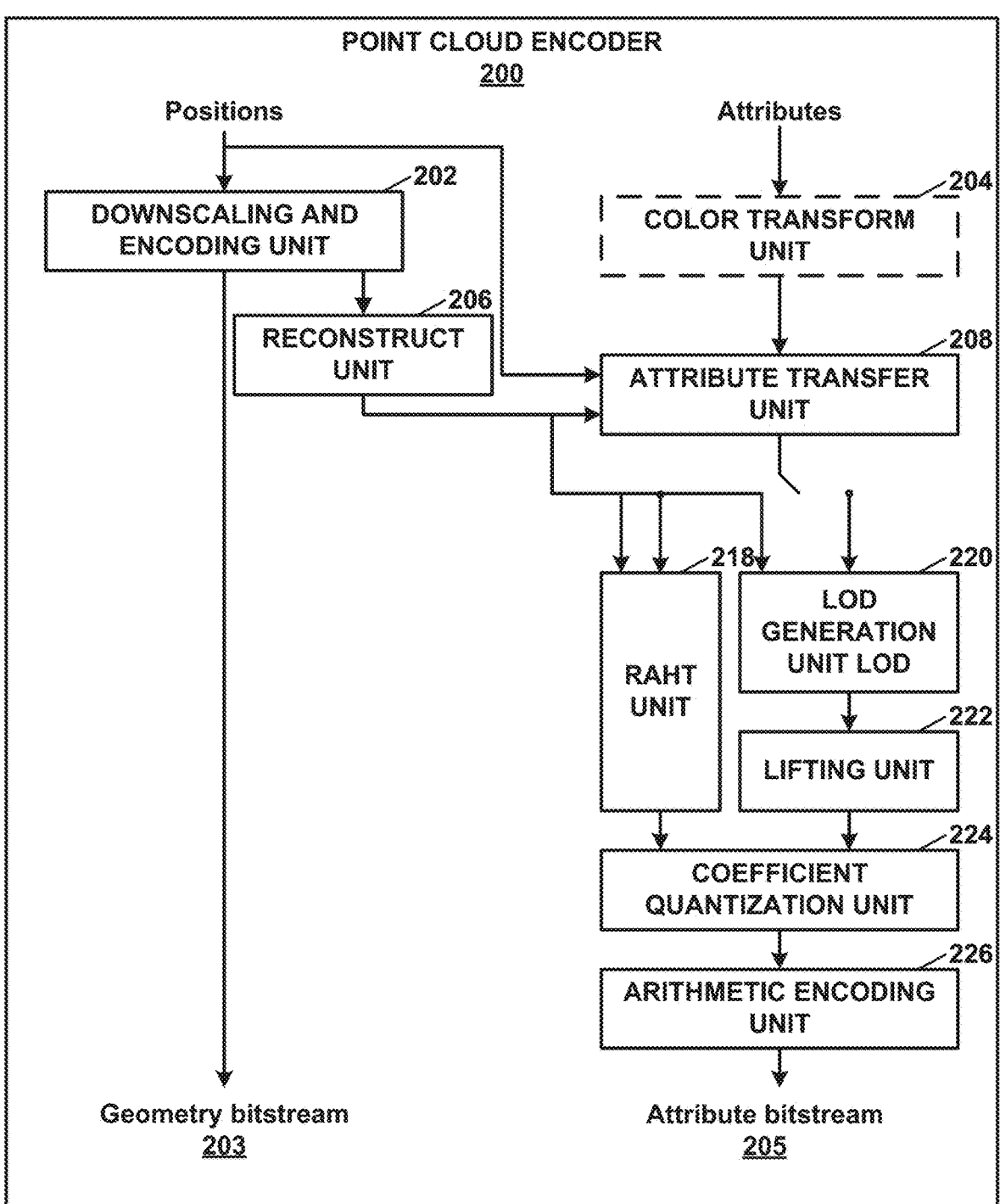
FIG. 2 is a block diagram illustrating an example point cloud encoder.
Figure 3:
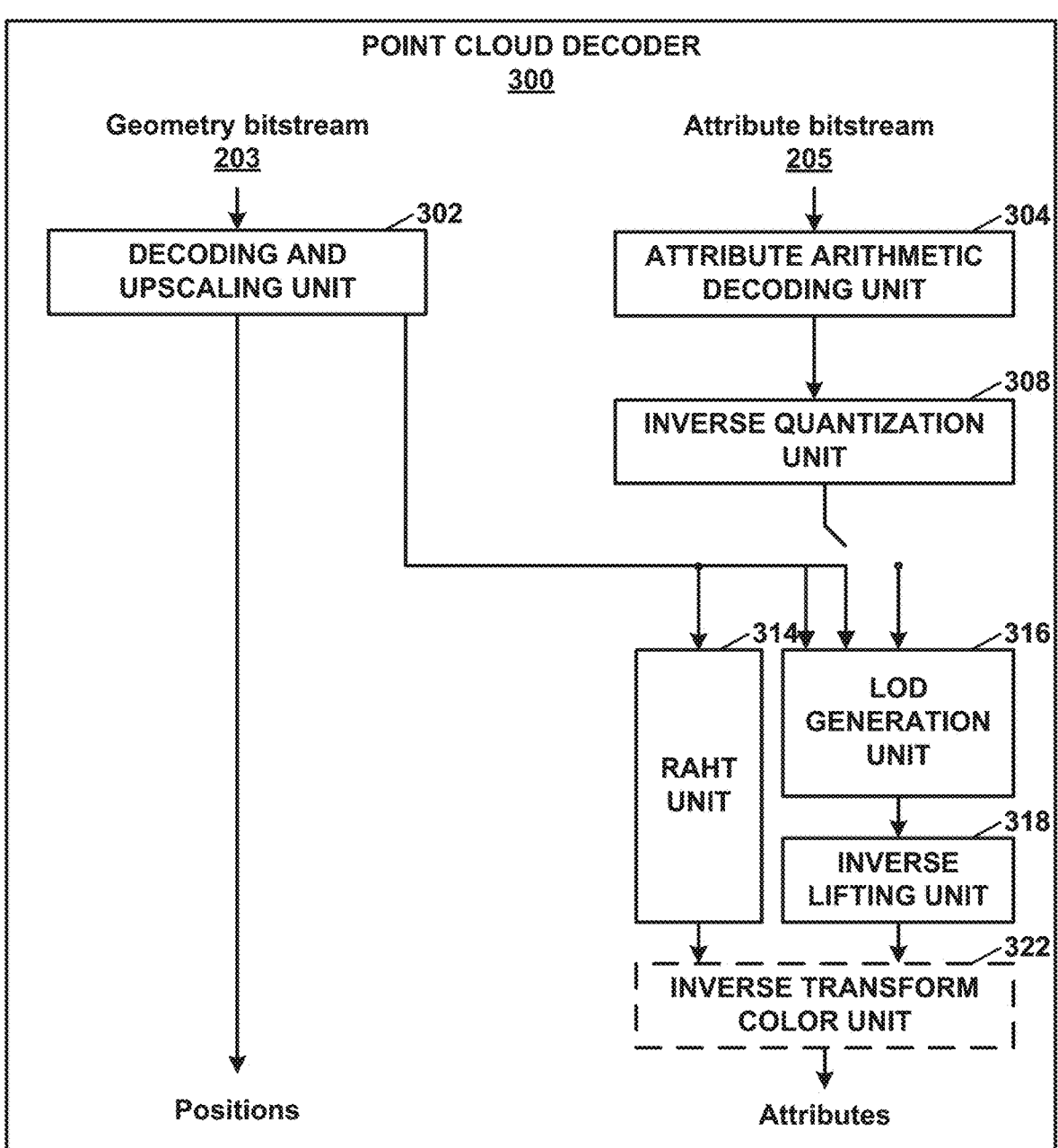
FIG. 3 is a block diagram illustrating an example point cloud decoder.

FIG. 2 provides an overview of point cloud encoder 200. FIG. 3 provides an overview of point cloud decoder 300. The modules shown are logical, and do not necessarily correspond one-to-one to implemented code in the reference implementation of point cloud codec, i.e., TMC13 test model software studied by ISO/IEC MPEG (JTC 1/SC 29/WG 11).

In some cases, compressed geometry may be represented as an octree from the root all the way down to a leaf level of individual voxels. In some cases, compressed geometry may be represented by a pruned octree (i.e., an octree from the root down to a leaf level of blocks larger than voxels) plus a model that approximates the surface within each leaf of the pruned octree. In this way, various types of data may share the octree coding mechanism, while in some cases, data may approximate the voxels within each leaf with a surface model. The surface model used is a triangulation comprising 1-10 triangles per block, resulting in a triangle soup.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in point cloud: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in point cloud, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At point cloud encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, point cloud encoder 200 includes a downscaling and encoding unit 202, reconstruct unit 206, a color transform unit 204, an attribute transfer unit 208, a RAHT unit 218, a LOD generation unit 220, a lifting unit 222, a coefficient quantization unit 224, and an arithmetic encoding unit 226.

As shown in the example of FIG. 2, point cloud encoder 200 may obtain a set of positions of points in the point cloud and a set of attributes. Point cloud encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. Point cloud encoder 200 may generate a geometry bitstream 203 that includes an encoded representation of the positions of the points in the point cloud. Point cloud encoder 200 may also generate an attribute bitstream 205 that includes an encoded representation of the set of attributes.

Downscaling and encoding unit 202 may generally downscale received geometry data by a certain amount, e.g., along the X-, Y-, and/or Z-axis, and encode the downscaled geometry data. In some examples, downscaling and encoding unit 202 may include a series of sets of downscaling and encoding task units that, as a unit, each downscale and encode the geometry data by a certain amount, then pass the downscaled and encoded geometry data to a subsequent task unit. In other examples, downscaling and encoding unit 202 may include a series of downscaling stages that each downscale the geometry data, then a set of one or more encoding task units that encode the downscaled geometry data.

Downscaling and encoding unit 202 may downscale input geometry data (e.g., an octree) by a factor of 8: a factor of 2 along the X-axis, a factor of 2 along the Y-axis, and a factor of 2 along the Z-axis. Such downscaling may be performed by artificial intelligence/machine learning (AI/ML) unit, such as a neural network. Additional details regarding examples of such downscaling are discussed below.

Color transform unit 204 may apply a transform to transform color information of the attributes to a different domain. For example, color transform unit 204 may transform color information from an RGB color space to a YCbCr color space.

Reconstruct unit 206 may decode and reconstruct the geometry data. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Additionally or alternatively, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, . . . LODN is obtained by union of RL1, RL2, . . . RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. Point cloud encoder 200 may output these syntax elements in attribute bitstream 205. Attribute bitstream 205 may also include other syntax elements, including non-arithmetically encoded syntax elements.

In the example of FIG. 3, point cloud decoder 300 includes a decoding and upscaling unit 302, an attribute arithmetic decoding unit 304, an inverse quantization unit 308, a RAHT unit 314, a LoD generation unit 316, an inverse lifting unit 318, an inverse transform coordinate unit 320, and an inverse transform color unit 322.

Point cloud decoder 300 may obtain a geometry bitstream 203 and an attribute bitstream 205. Decoding and upscaling unit 302 of decoder 300 may decode a value indicating an amount of upscaling to be applied to the geometry data. Furthermore, decoding and upscaling unit 302 may both decode and upscale the geometry data, where the amount of upscaling may correspond to the decoded value. In some examples, decoding and upscaling unit 302 may include a sequence of sets of units including both decoding and upscaling units, where the number of sets is equal to the decoded value representing the amount of upscaling. In some examples, decoding and upscaling unit 302 may include one or more decoding units, then a sequence of sets of upscaling units, where the number of sets is equal to the decoded value representing the amount of upscaling. In some examples, decoding and upscaling unit 302 may further reconstruct a point cloud geometry using the decoded and upscaled point cloud geometry data.

Attribute arithmetic decoding unit 304 may apply arithmetic decoding to syntax elements in attribute bitstream 205.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in point cloud codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at point cloud encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 4:
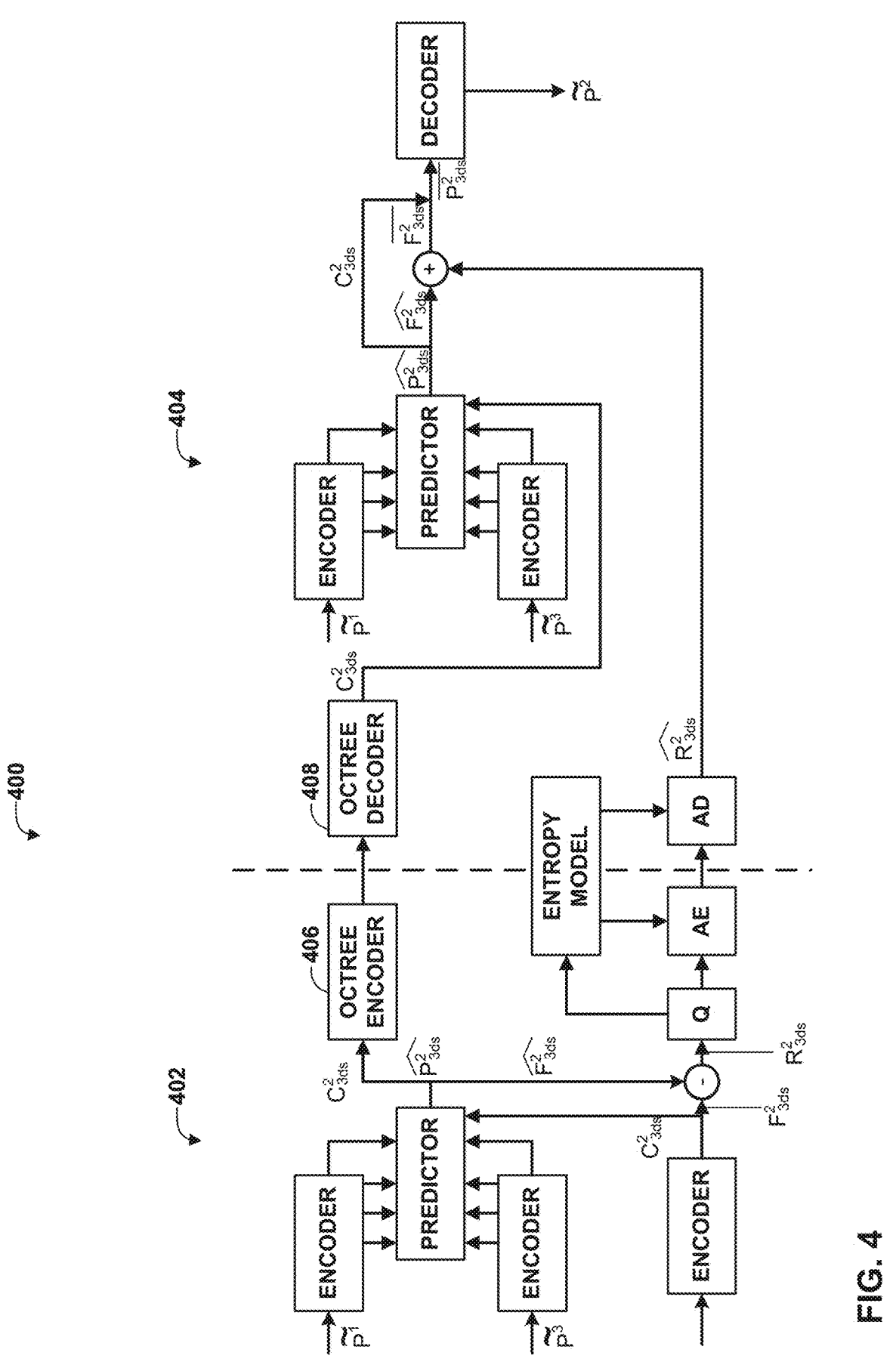
FIG. 4 is a conceptual diagram illustrating an example system model for performing techniques of this disclosure.

FIG. 4 is a conceptual diagram illustrating an example system model for performing techniques of this disclosure. This disclosure describes a lossy geometry compression scheme that may be performed by system 400 of FIG. 4 to predict a latent representation of a current frame of point cloud data using a previous frame (a previously decoded frame) by employing a prediction network. System 400 performs P-frame inter-frame point cloud encoding where the current frame is encoded with the help of the previously decoded frame. System 400 may be implemented using a sparse convolution neural network (CNN) with sparse tensors. System 400 may employ convolution on target coordinates to map the latent representation of the previous frame to the downsampled coordinates of the current frame to predict the feature embedding of the current frame. System 400 may transmit the residual of the predicted features and the actual features by compressing them using a learned probabilistic factorized entropy model. Compared with G-PCC and V-PCC, the techniques performed by FIG. 4 according to this disclosure show better compression performance on dense point clouds with efficient encoding/decoding runtime, as discussed in greater detail below.

Conventional deep learning-based PCC solutions include intra-prediction techniques for static point clouds and do not utilize inter-prediction coding gains by predicting the current frame using previously decoded frames. The techniques of this disclosure include a deep learning-based framework for point cloud geometry inter-frame encoding, similar to P-frame encoding in video compression. The techniques of this disclosure include a predictor module that learns a feature embedding of a current PC frame from a previous PC frame. The network may use hierarchical multiscale feature extractions and may employ convolution on target coordinates to map latent features from the previous frame to the downsampled coordinates of the current frame to learn the feature embedding of the current frame.

Point cloud geometry compression (PCGC) is an intra-frame point cloud compression scheme suitable for static point clouds. The inter-frame prediction scheme of this disclosure uses an encoder and decoder network along with a prediction network to predict a feature embedding for the current PC frame from the previous PC frame. According to these techniques, system 400 may calculate a residual (that is, a series of differences) between the predicted and ground truth features, and may then transmit the residual features along with the three-times downsampled coordinates. The three-times downsampled coordinates may be losslessly encoded by octree encoder 406 using a G-PCC TMC13 octree codec, e.g., as discussed above with respect to FIG. 2. The residual features may be encoded in a lossy manner using a factorized entropy model to predict the probability distribution for arithmetic coding. It should be noted that in system 400, the encoder and prediction network are present both at transmitter 402 and receiver 404. The network is trained with joint reconstruction and bit-rate loss to optimize rate distortion. Octree encoder 406 may generally correspond to portions of point cloud encoder 200 of FIG. 2, while octree decoder 408 may generally correspond to portions of point cloud decoder 300 of FIG. 3. Transmitter 402 may generally correspond to source device 102 of FIG. 1, while receiver 404 may generally correspond to destination device 116 of FIG. 1.

In the example of FIG. 4, system 400 includes transmitter 402 and receiver 404. Transmitter 402 uses previously decoded frame $\widetilde{p^1}$ to encode a feature embedding of current frame $p^2$. The predictor network processes multiscale features from previously decoded frame $\widetilde{p^1}$ and three-times downsampled coordinates $$C^2_{3ds}$$

from $p^2$ to learn a feature embedding $$p^{\widetilde{2}}_{3ds} = \{C^2_{3ds}, F^{\widetilde{2}}_{3ds}\}.$$

Transmitter 402 transmits three-times downsampled coordinates $$C^2_{3ds}$$

to receiver 404 in a lossless manner using an octree encoder. Transmitter 402 may subtract the predicted downsampled features $$F^{\widetilde{2}}_{3ds}$$

and the original downsampled features $$F^2_{3ds}$$

to calculate residual features $$R^2_{3ds}.$$

Transmitter 402 may then transmit the residual features $$R^2_{3ds}$$

in a lossy manner using a learned entropy model.

This disclosure interchangeably uses the terms "downscaled" and "downsampled." The overall framework can be viewed as a transmission system, compression pipeline, or a deep learning model. In terms of a transmission system, elements before the bitstream generation may be referred to as forming part of a "transmitter" and elements after the bitstream may be referred to as forming part of a "receiver." System 400 of FIG. 4 may include the encoder and predictor modules at transmitter 402, and the encoder, predictor, and the decoder module at receiver 404. In terms of compression pipeline, system 400 may be viewed as including both the encoding part and the decoding part. In FIG. 4, the predictor module is employed in both the encoding of the frame as well as the decoding of the frame. In terms of deep learning model, the encoder may be viewed as a multi-scale feature extractor, whereas the decoder can be viewed as a progressive upscaling network with hierarchical reconstruction of the point cloud.

Figure 5:
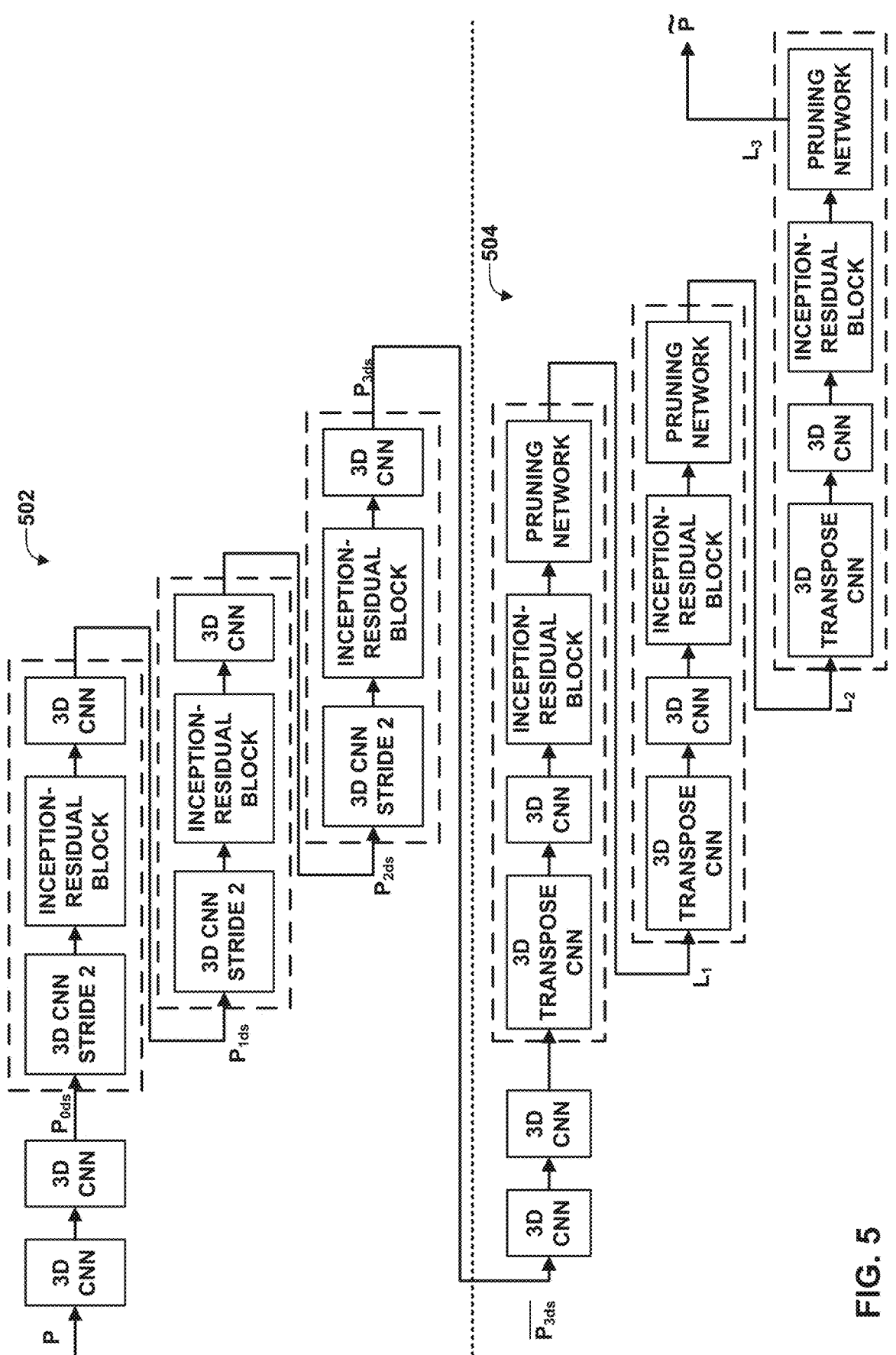
FIG. 5 is a conceptual diagram illustrating an example encoder and decoder network.

FIG. 5 is a conceptual diagram illustrating an example encoder network 502 and decoder network 504. Encoder network 502 may correspond to all or a portion of point cloud encoder 200. Encoder network 502 may obtain PC tensors at four different scales capturing multiscale features at different level of details:

$$P_{0ds}, P_{1ds}, P_{2ds}, P_{3ds} = E(P)$$

where $P_{ids}$ represents a sparse tensor P that has been downsampled i times. Decoder network 504 may correspond to all or a portion of point cloud decoder 300. Decoder network 504, in this example, receives a three-times downsampled PC tensor and upsamples the downsampled PC tensor hierarchically to reconstruct the original PC tensor, employing a different reconstruction loss at each scale. Decoder network 504 may employ transpose convolution to upsample the PC tensor.

That is, encoder network 502 may create sparse features from an original point cloud sparse tensor P at four different scales: $P_{0ds}, P_{1ds}, P_{2ds}$, and $P_{3ds}$. Decoder network 504 may receive the three-times downsampled sparse tensor and hierarchically reconstruct the original point cloud using progressive rescaling. Decoder network 504 may upsample the sparse tensor followed by a pruning layer to prune false voxels.

In this manner, FIG. 5 depicts an example of encoder network 502 including a series of sets of units, each set of units including a downscaling unit and encoding units. The number of sets in the series may be equal to a value encoded in a bitstream indicating a number of times the geometry data is downscaled. Likewise, FIG. 5 depicts an example of decoder network 504 including a series of sets of units, each set of units including decoding units and upscaling units. The number of sets in the series may be equal to a value decoded from the bitstream indicating the number of times the geometry data is to be upscaled.

Figure 6:
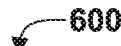
FIG. 6 is a block diagram illustrating an example pruning layer of a decoder according to the techniques of this disclosure.
Figure 6:
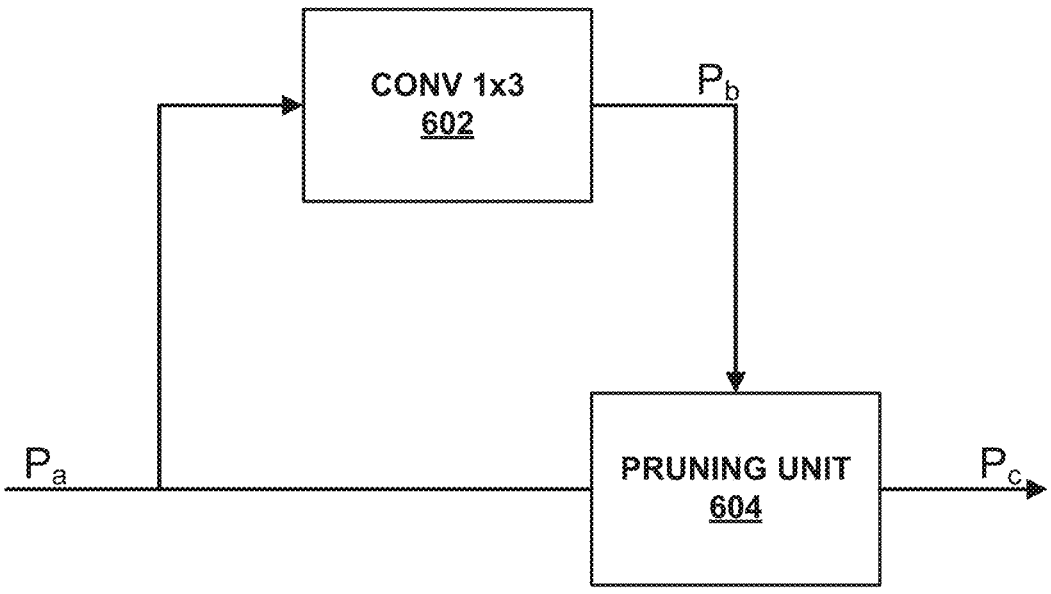

FIG. 6 is a block diagram illustrating example pruning layer 600 of a decoder according to the techniques of this disclosure. The decoder may reconstruct the geometry of a PC using pruning layer 600. Pruning layer 600 may prune false voxels and extract true occupied voxels using a binary classification after each upscaling.

In the example of FIG. 6, the input sparse tensor $P_a$ has coordinates $C_a$ of shape 139,244×3 and their corresponding features of shape 139,244×64. $P_a$ is passed through a convolution (CONV 1×3 602) of channel size 1 to obtain sparse tensor $P_b$ with features $F_b$ of shape 139,244×1. From $F_b$, the top$_k$ features (in this example k=52,612) and their corresponding coordinates are selected using binary classification. Pruning unit 604 then prunes false coordinates and their corresponding features from $P_a$ to obtain $P_c$. During training, the binary voxel classification loss is applied to $P_b$ to learn the proper point cloud reconstruction.

Figure 7:
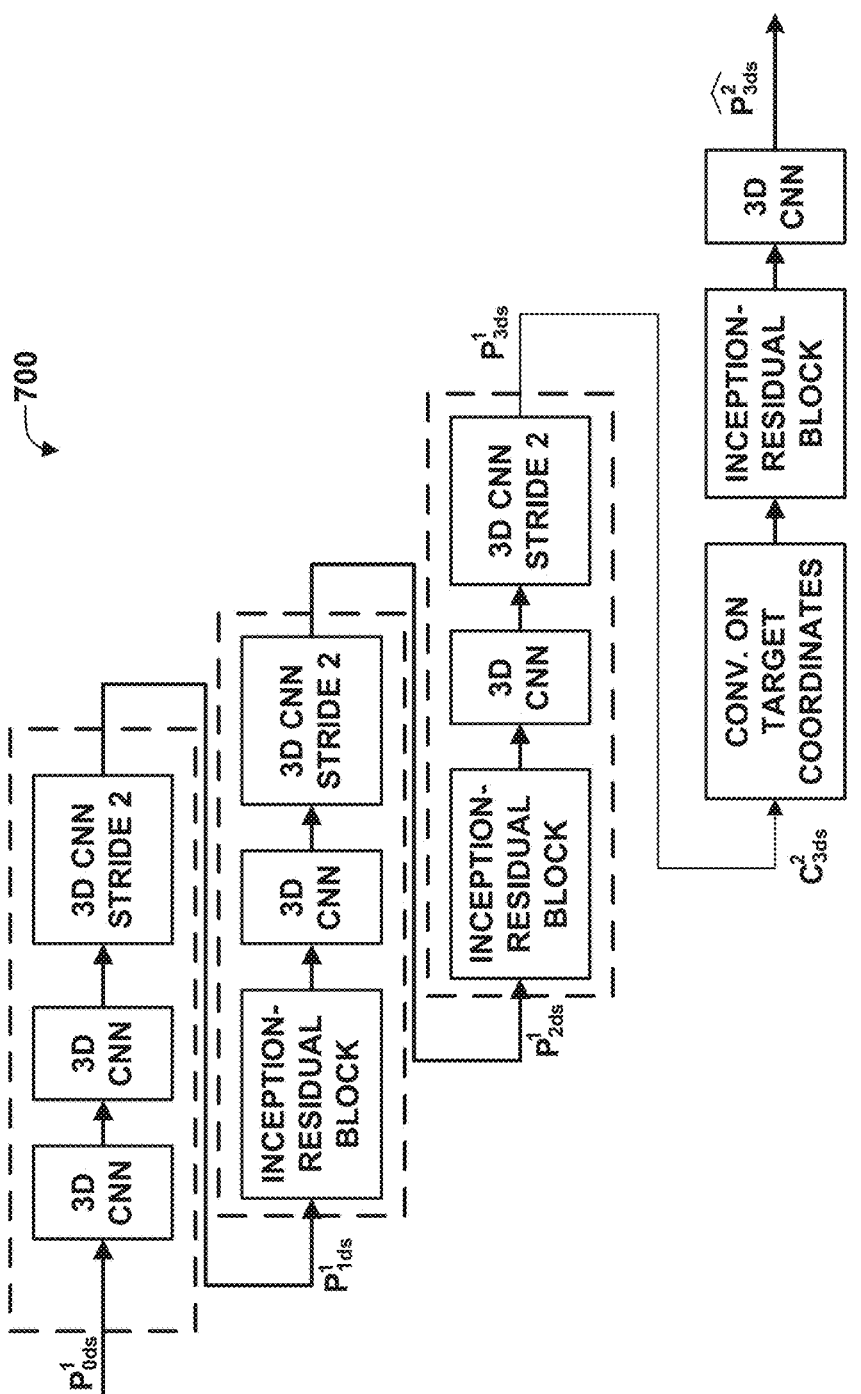
FIG. 7 is a conceptual diagram illustrating an example prediction network.

FIG. 7 is a conceptual diagram illustrating an example prediction network 700. Prediction network 700 may be configured to predict the latent representation of a current frame from a previously reconstructed frame. Prediction network 700 may be included in an encoder, such as point cloud encoder 200, transmitter 402, or encoder network 502, or in a decoder, such as point cloud decoder 300, receiver 404, or decoder network 504. Prediction network 700 down-scales the input three times while concatenating the down-scaled input with the corresponding scale features. Finally, prediction network 700 employs convolution on target coordinates to obtain features for the current frame.

In the example of FIG. 7, prediction network 700 receives four multiscale features from a previous frame and three-times downsampled coordinates of the current frame $$(C^2_{3ds})$$

to learn a feature embedding $$p^{\tilde{z}}_{3ds}$$

for a current frame.

Figure 8:
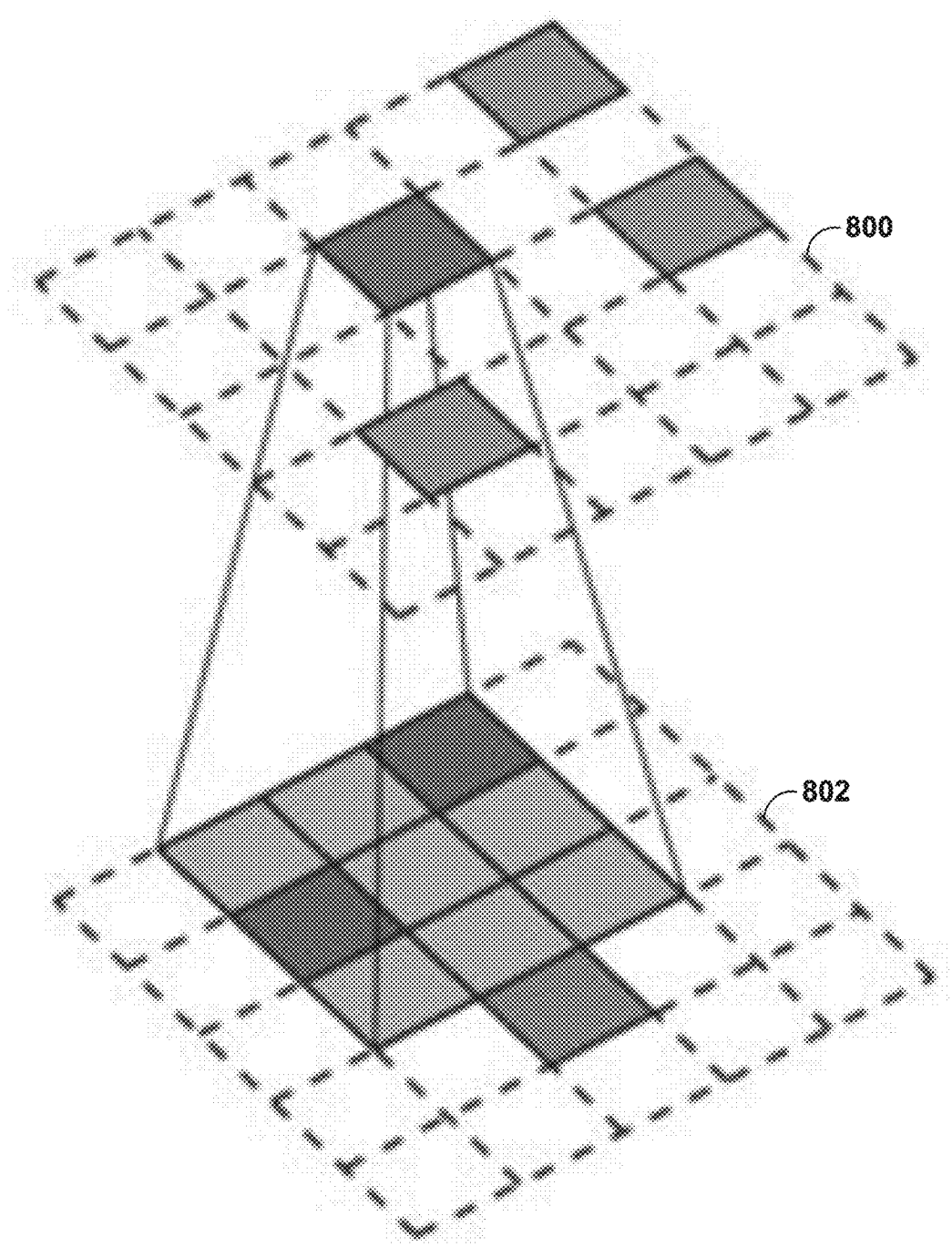
FIG. 8 is a conceptual diagram illustrating an example convolution on target coordinates in two-dimensions (2D).

FIG. 8 is a conceptual diagram illustrating an example convolution on target coordinates in two-dimensions (2D). Inputs are shown in illustrated bottom layer 802 (in particular, shaded cells of the bottom layer) while corresponding output coordinates are shown as the shaded cells of top layer 800 in FIG. 8.

Convolution on target coordinates helps translate latent features from the downsampled coordinates of $P^1$, i.e., $$C^2_{3ds}$$

to the downsampled coordinates of $P^2$, i.e., $$C^1_{3ds}.$$

Convolution on target coordinates can be viewed as a convolution with arbitrary input and output coordinates where the features from input coordinates get convolved with the convolutional kernel and the output is only retained at the output coordinates.

The techniques of this disclosure were implemented and tested. During implementation and testing, to decrease computational complexity during training, point cloud (PC) frames were divided into smaller chunks by applying the same kd-tree partition on two consecutive frames. During inference time, whole point clouds were used. Ten-bit dataset representations were used for both training and testing.

The techniques of this disclosure were compared with the deep learning intra-frame techniques of PCGC, G-PCC (octree as well as trisoup) techniques, as well as V-PCC method (inter and intra-frame encoding). Reference implementation TMC13-v14 of G-PCC was employed, while for V-PCC, the implementation TMC2-v17 was employed that uses an HEVC video codec. V-PCC inter-frame low-delay setting was used to encode the point clouds, which involves P-frame encoding for a fair comparison to the proposed P-frame encoding scheme. The table below summarizes the testing approach:

| Stage | Reporting Type | Parameters |
|---|---|---|
| Training stage platform information | Mandatory | GPU Type: GeForce RTX 3090 24GB |
| | | CPU Type: 11th Gen Intel i9-11900F @ 2.50 GHz × 16 |
| | | Framework: PyTorch |
| | | Number of GPUs: 1 |
| Training stage | Mandatory | Batch size: 5 |
| | | Loss functions: BCE Loss |
| | | Learning rate policy: Initial learning rate 0.0008 + Adam + linear scheduler (lr/2 every 1000 steps) |
| | | Training time (CPU/GPU): None/24 h |
| | | Dataset choices: Explained in a table below |
| | | Epochs (or number of iterations): 50 |
| | | Configuration per RD point: $\alpha = 1$, $\beta = 1$, 1.7, 2.5, 4, 6, 10 |
| | | Pre-processing: quantization |
| | | Network Model: |
| | | Number of parameters: 2.03M |
| | | Parameter precision: 32 (F) |
| | | Total Memory (MB) |
| | | Peak Memory Usage (Total): 15G |
| | | Peak Memory Usage (per Model): 15G |
| | Optional | Optimizer: Adam |
| Inference stage platform information | Mandatory | GPU Type: GeForce RTX 3090 24GB |
| | | CPU Type: 11th Gen Intel i9-11900F @ 2.50 GHz × 16 |
| | | Framework: PyTorch |
| | | Number of GPUs: 1 |
| Inference stage | Mandatory | Total Memory (MB) |
| | | Peak Memory Usage (Total): 6G |
| | | Peak Memory Usage (per Model): 6G |
| Datasets (10-bit representation) | | |
| Training Sequences | | Longdress, Loot, Queen |
| Test Sequences | | RedAndBlack, Soldier, Basketball, Exercise, Model |

The following table summarizes Bjontegaard Delta (BD)-Rate gains of the techniques of this disclosure compared to other conventional techniques using D1 distortion measurements for various standardized test sequences:

| | G-PCC (octree) | G-PCC (trisoup) | PCGC | V-PCC intra | V-PCC inter |
|---|---|---|---|---|---|
| Basketball Exercise | −92.01 | −87.80 | −32.45 | −60.46 | −48.82 |
| Model | −91.70 | −87.02 | −35.44 | −62.08 | −48.30 |
| Red and Black | −89.86 | −83.24 | −33.69 | −61.93 | −51.80 |
| | −91.42 | −81.25 | −28.31 | −59.33 | −55.58 |
| Soldier | −92.75 | −82.61 | −40.16 | −66.51 | −43.60 |
| Average | −91.68 | −84.41 | −34.08 | −62.69 | −52.44 |

Figure 9:
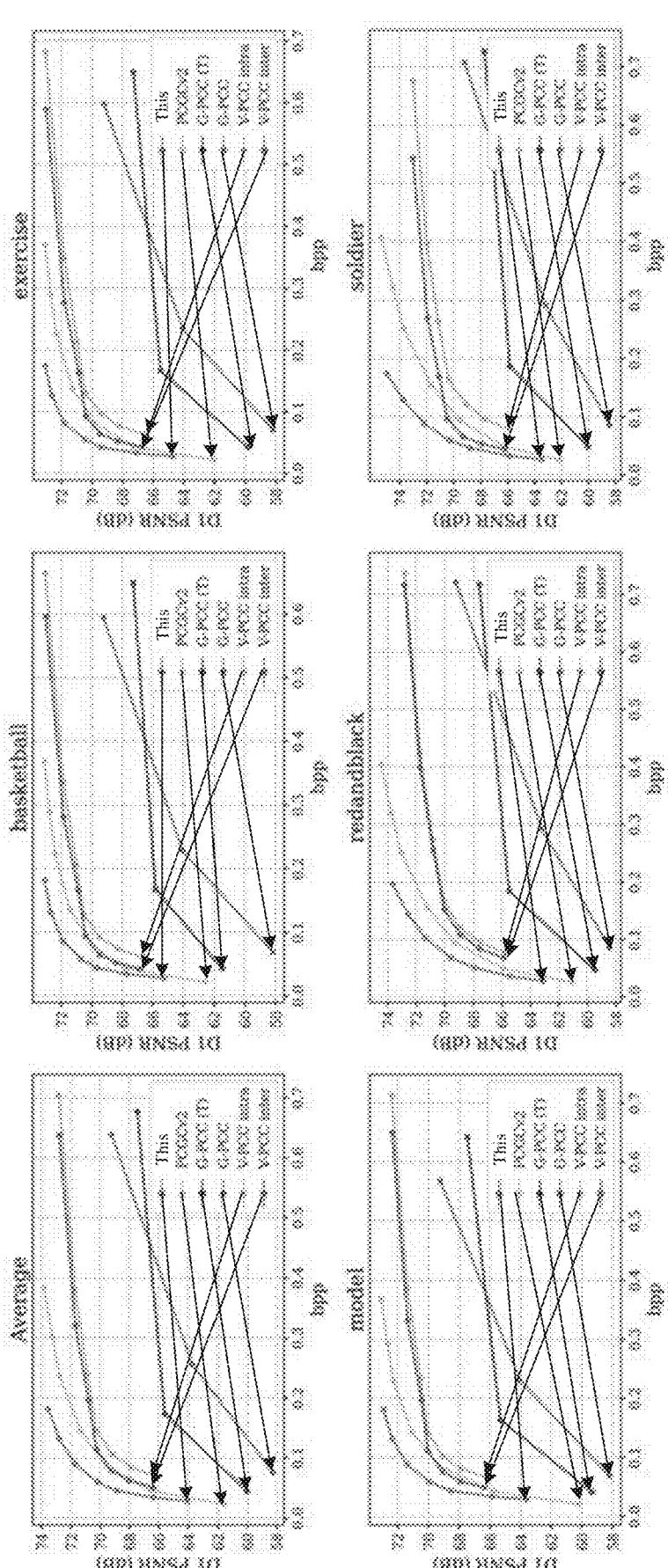
FIGS. 9 and 10 are graphs representing rate-distortion curves comparing the techniques of this disclosure to other conventional techniques.
Figure 10:
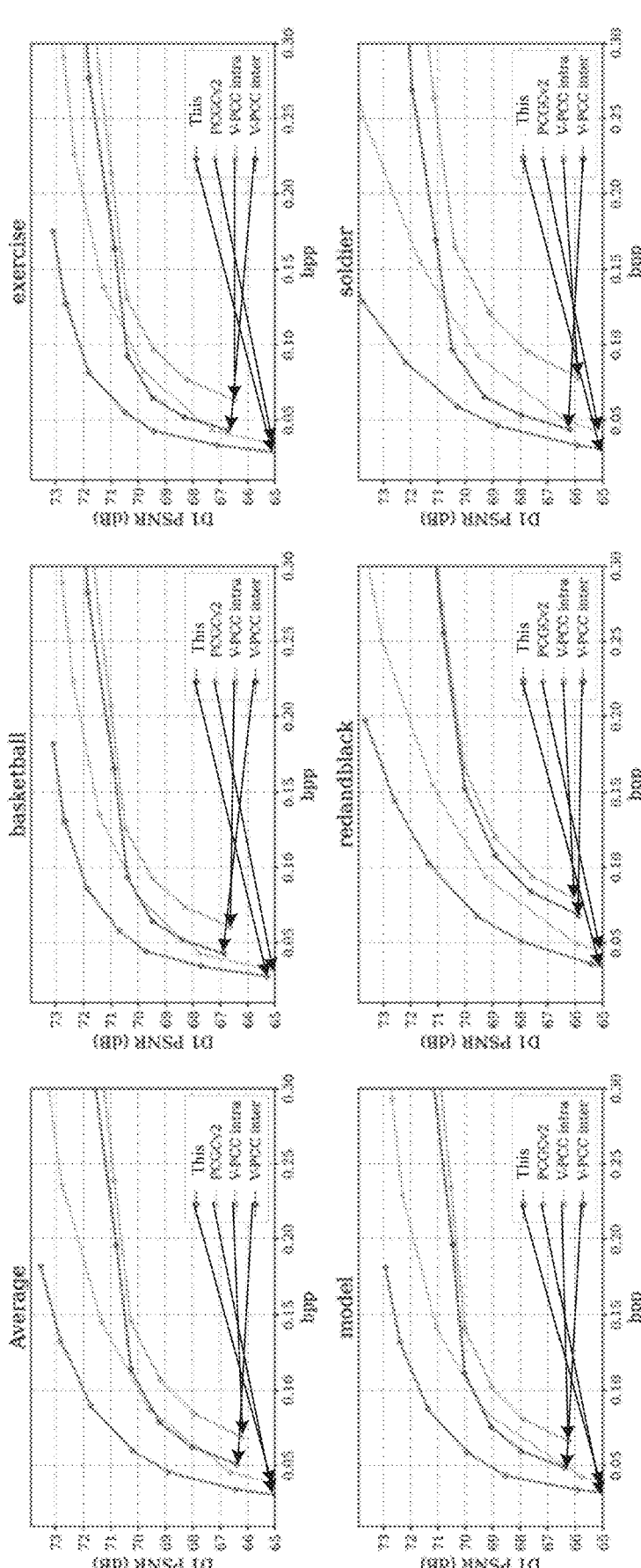

FIGS. 9 and 10 are graphs representing rate-distortion curves comparing the techniques of this disclosure to other conventional techniques.

In the testing discussed above, an Intel Core i9-11900F CPU and an Nvidia GeForce GTX 3090 GPU were employed. G-PCC runtime was computed for the highest bitrate on the CPU. Both PCGC and the proposed method ("This") utilize the GPU. Due to the diversity in platforms, e.g., CPU vs. GPU, Python vs. C/C++, and other such implementation differences, the running time comparison serves as an intuitive reference to represent general computational complexities.

The table below depicts encoding and decoding run times for various techniques compared to the techniques of this disclosure ("This Disclosure"):

| | G-PCC (O) | G-PCC (T) | PCGC | This Disclosure |
|---|---|---|---|---|
| Enc (s) | 1.13 | 6.15 | 0.258 | 0.364 |
| Dec (s) | 0.44 | 5.01 | 0.537 | 0.714 |

| Number of parameters | |
|---|---|
| PCGC | 778,000 |
| This Disclosure | 2,033,000 |

This disclosure describes a deep learning-based inter-frame compression scheme for dynamic point clouds that encodes the current frame using the previously decoded previous frame. The techniques of this disclosure employ an encoder to obtain multi-scale features and a decoder to hierarchically reconstruct the point cloud by progressive scaling. The prediction network module may predict the latent representation of the current frame by mapping the latent features of the previous frame to the downsampled coordinates of the current frame using convolution on target coordinates. The residual of the predicted features and the actual features are encoded and transmitted. Experimental results show more than 91% BD-Rate gains over the G-PCC (octree), more than 84% BD-Rate gains over G-PCC (trisoup), more than 34% BD-Rate gains over intra-frame network PCGC, more than 62% BD-Rate improvement over V-PCC intra-frame encoding mode, and more than 52% BD-Rate improvement over V-PCC inter-frame low-latency encoding mode.

The inter-frame point cloud compression scheme discussed above is an example of P-frame point cloud encoding, in which a previous frame is used to encode a current frame. Similar techniques can be implemented for I-frame based intra-frame point cloud encoding as well as B-frame based inter-frame point cloud encoding.

Figure 11:
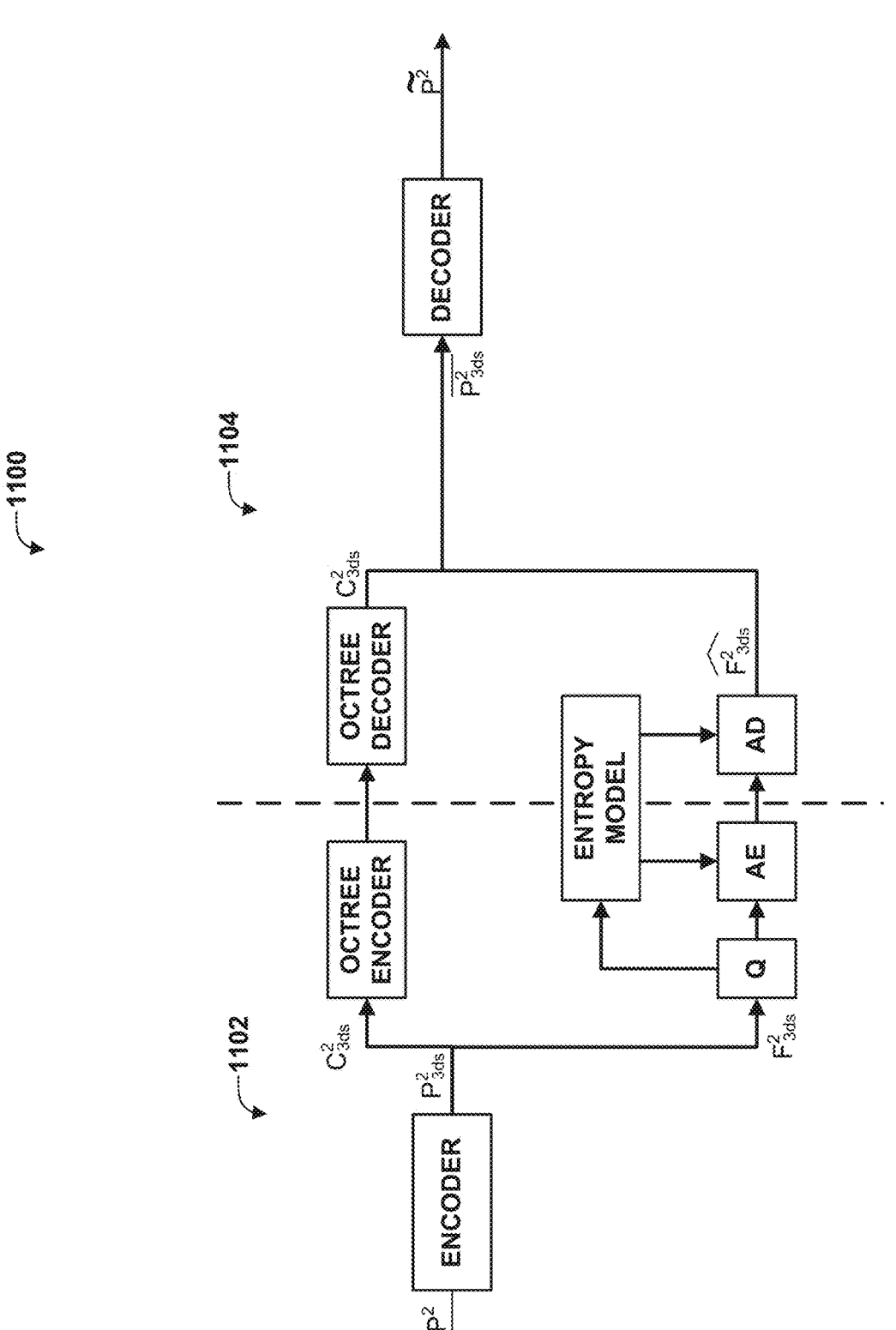
FIG. 11 is a conceptual diagram illustrating an example system for intra (I)-frame based intra-frame point cloud encoding.

FIG. 11 is a conceptual diagram illustrating an example system 1100 for intra (I)-frame based intra-frame point cloud encoding. In Intra-frame encoding, only the current frame is used to encode the current frame. System 1100 includes encoder portion 1102 and decoder portion 1104.

Figure 12:
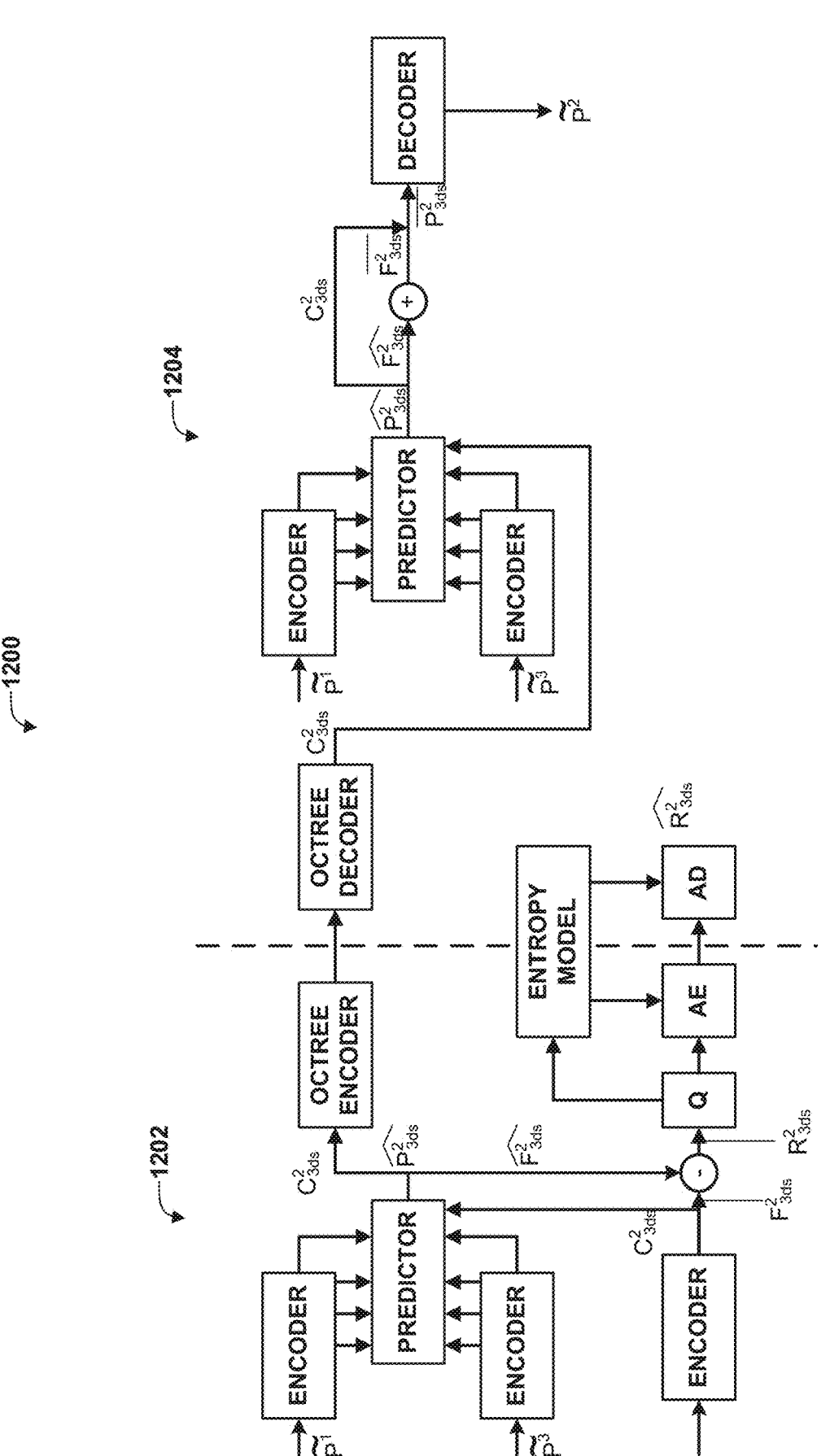
FIG. 12 is a conceptual diagram illustrating an example system for bi-directional intra-prediction (B)-frame encoding.

FIG. 12 is a conceptual diagram illustrating an example system 1200 for bi-directional intra-prediction (B)-frame encoding. System 1200 includes encoder portion 1202 and decoder portion 1204. In B-frame encoding, both a previous frame and a next frame (in display order) may be used to encode a current frame.

The I-frame, P-frame, and B-frame methods mentioned above use a fixed downscaling parameter in the encoder to obtain a three-times downscaled representation of the point cloud with geometry and the corresponding coordinates. Each time the geometry is downscaled by 2×, resulting in an 8× total geometry downscaling. The three-times (8×) downscaled coordinates may be transmitted in a lossless manner, whereas the corresponding features may be transmitted in a lossy manner. This way, the techniques of this disclosure may produce a constant bitrate cost in terms of the three-times downsampled coordinates $$(C_{3ds}^2).$$

The three-times downsampled features $$(F_{3ds}^2)$$

may be encoded with different bitrates to obtain different levels of distortion in the reconstructed point cloud.

The techniques of this disclosure may provide a flexible configuration in a system model, where rather than having a fixed three-times downscaled representation of the point cloud, there may be different architectures that produce different downscaled representations of the point cloud. In this way, the level of downscaling needed to obtain best performance can be chosen. Therefore, these techniques may allow for a different number of variable bitrate costs for the downscaled coordinates $$(C_{i-ds}^2$$

where i is the number of times downscaled coordinates) as well as for the corresponding features $$(F_{i-ds}^2)$$

Consequently, these techniques may allow more flexibility in the system and may produce better compression performance.

Referring again to FIG. 4, system 400 may use a level of downscaled representation to indicate an operating parameter of a model, e.g., a level at which coordinates are transmitted in a lossless manner. For example, a level x may indicate that the downscaled representation of the point cloud is obtained after x downscaling steps. In another example, a level x may indicate that the downscaled representation is obtained using downscaling by a factor f(x), i.e., a function of x (e.g., f(x)=2^x). Vice versa, at the receiver, the level x indicates the number of upscaling steps of the model.

Transmitter 402 may signal a syntax element in the bitstream to indicate the level of downscaled representation. For example, transmitter 402 may signal syntax element ds_level_minus1, where ds_level_minus1+1 specifies the level of downscaling representation used for coding. The decoder of receiver 404 may decode this syntax element to determine the number of upscaling steps to decode the bitstream.

In one alternative, transmitter 402 may signal the syntax element in association with one or more frames. Receiver 404 may use the signaled value to derive the level of downscaled representation for the one of more frames.

System 400 may be configured to transmit the three-times downscaled coordinates $$(C_{3ds}^2)$$

which incurs a constant bitrate cost (e.g., 0.023 bpp on some point clouds). Having a constant bitrate on the coordinates provides limited flexibility, as the reconstructed point cloud quality can only be changed by changing the feature bitrate. At lower bitrates, the bitrate lower bound is the geometry bits, and at higher bitrates, the upper bound in peak signal to noise ratio (PSNR) is also due to the geometry bits. Examples of the bottleneck caused by a constant coordinate bitrate are discussed below.

Figure 13:
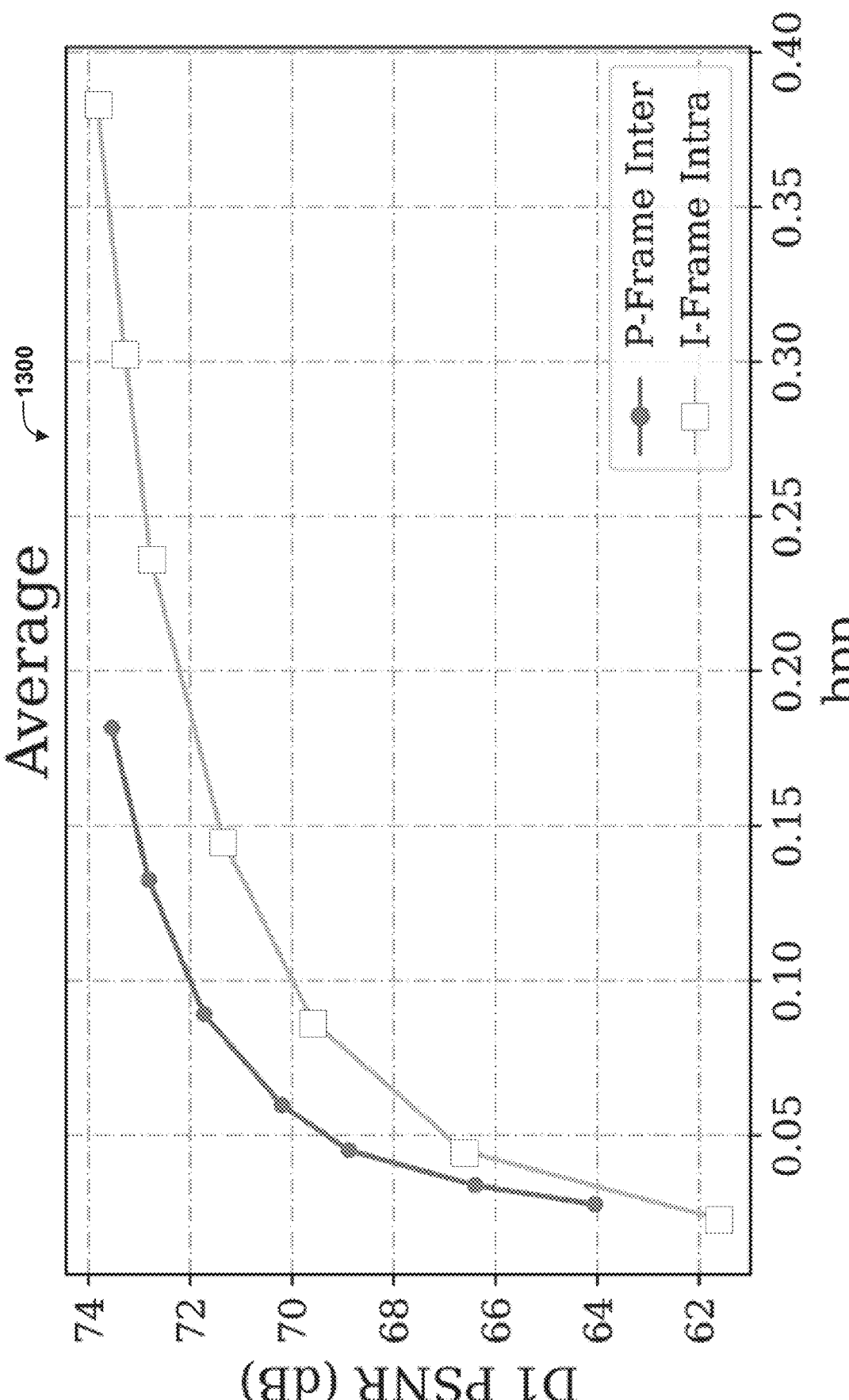
FIG. 13 is a graph representing rate-distortion curves for the techniques of this disclosure.

FIG. 13 is a graph 1300 representing rate-distortion curves for the techniques of this disclosure. As can be seen, the lowest bitrate point for P-frame is {bpp: 0.0278, PSNR: 64.04} while the lowest bitrate point for I-frame is {bpp: 0.0231, PSNR: 61.60}. FIG. 13 shows that at the lowest bitrates, most of the bitrate is consumed by the coordinates $$(C_{3ds}^2)$$

which are about 0.023 bpp, whereas the bitrate of the features $$(F_{3ds}^2)$$

is close to zero. In this scenario, downscaling the point cloud representation to more than three-times downscaled version would decrease the coordinates $$(C_{i-ds}^2,$$

where i>3) bitrate, which would allow some information to be sent through the features. This would provide more flexibility and better reconstruction quality.

Similarly, for the highest bitrate and PSNR, the P-frame point is {bpp: 0.1818, PSNR: 73.54}, while the I-frame point is {bpp: 0.3837, PSNR: 73.83}. At these points the constant bitrate consumed by the coordinates $$(C_{3ds}^2)$$

is about 0.023 bpp which is negligible when compared with the high overall bitrate like 0.3837 bpp or 0.1818 bpp. In this scenario, most of the bitrate is being consumed by the features. Having a point cloud representation with less than three-times downscaled version may increase the coordinates $$(C_{i-ds}^2,$$

where i<3) bitrate may allow for a decrease to the feature bitrate, resulting in a better quality of the reconstructed point cloud.

Multiple system models are employed with the ability to generate different downscaled/downsampled representation of point clouds. This would provide more flexibility in the rate-distortion curves to generate a better quality of point cloud with fewer bits. Extra bits may be sent from transmitter 402 to receiver 404 of FIG. 4 to indicate which encoder was employed, so the corresponding decoder could be used at receiver 404. Similarly, for inter-frame coding, dedicated predictor modules may be employed for each level of downscaled representation.

The techniques of this disclosure can be employed in various use cases, such as: 1) in each type of compression technique (I-frame, P-frame, B-frame), even with the motion vectors and optical flow techniques employed; 2) point cloud attribute compression (beyond just geometry compression); and 3) any other sort of point cloud compression or communication task that involves downscaled representation of the point cloud and then rescaling the downscaled point cloud back to the reconstructed point cloud.

The number of times the geometry coordinates are downscaled may be signaled and coded in the bitstream by transmitter 402 to receiver 404. This way, receiver 404 can select the corresponding architecture and network to reconstruct and upsample the point cloud. This parameter may be signaled in one or more parameter sets, such as a sequence parameter set (SPS), geometry parameter set (GPS), or headers such as slice header, frame header, or the like.

Figure 14:
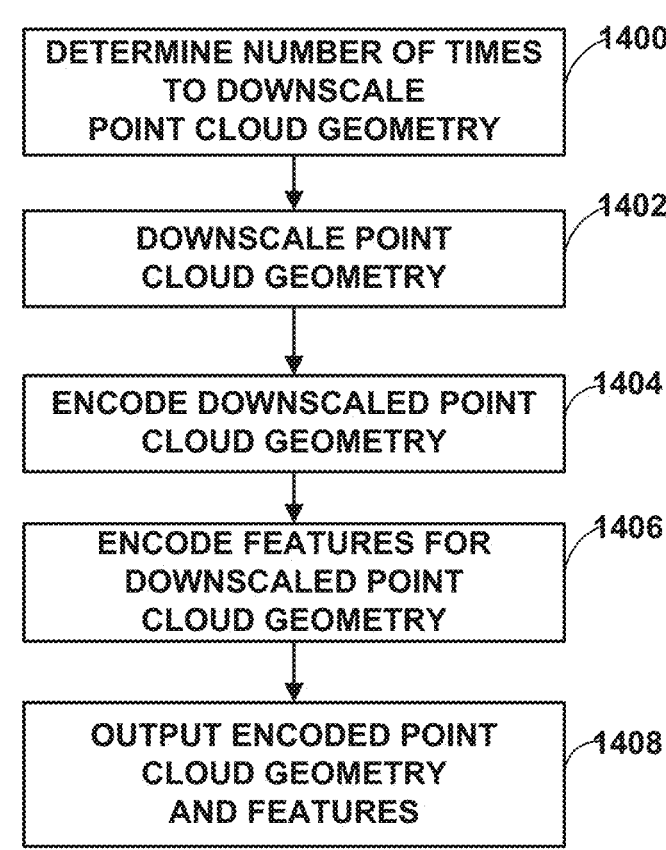
FIG. 14 is a flowchart illustrating an example method of encoding point cloud data according to the techniques of this disclosure.

FIG. 14 is a flowchart illustrating an example method of encoding point cloud data according to the techniques of this disclosure. The method of FIG. 14 is explained with respect to point cloud encoder 200. However, it should be understood that the method of FIG. 14 may also be performed by other devices, such as transmitter 402 of FIG. 4, encoder network 502 of FIG. 5, encoder portion 1102 of FIG. 11, or encoder portion 1202 of FIG. 12.

Initially, point cloud encoder 200 determines a number of times to downscale point cloud geometry of a point cloud (1400). For example, point cloud encoder 200 may retrieve configuration information indicating a number of times to downscale the point cloud geometry, e.g., along the X-, Y-, and Z-axis. In some examples, point cloud encoder 200 may be configured to downscale each of the X-, Y-, and Z-axis by a factor of two, for a total downscaling factor of 8. Downscaling and encoding unit 202 may downscale the point cloud geometry (e.g., a hierarchical octree) by the determined number of times (1402), e.g., 8. Downscaling and encoding unit 202, as discussed above, may be configured to perform such downscaling using an AI/ML model, as discussed with respect to FIGS. 4, 5, 6, 7, 11, and 12. In some examples, point cloud encoder 200 may encode data representing the number of times the point cloud geometry was downscaled, e.g., a value for syntax element ds_level_minus1, where ds_levelminus1+1 may indicate the number of times the point cloud geometry was downscaled.

Point cloud encoder 200 may also encode the downscaled point cloud geometry (1404). Downscaling and encoding unit 202, for example, may encode respective intermediate sets of downscaled point cloud geometry using an AI/ML model for downscaling and encoding point cloud geometry data. In particular, in some examples, as explained above, downscaling and encoding unit 202 may include a series of sets of units, where each set of units includes a downscaling unit (e.g., a convolutional neural network (CNN)) and a set of encoding units. The number of sets in the series may correspond to the number of times to downscale the point cloud geometry. Point cloud encoder 200 may also encode features for the downscaled point cloud geometry (1406). As discussed above, the features may include attribute data, such as color, reflectance, luminance, surface normals, or the like. Point cloud encoder 200 may then output the encoded point cloud geometry and features (1408), e.g., as a bitstream.

In this manner, the method of FIG. 14 represents an example of a method of encoding point cloud geometry data including determining a number of times to downscale a representation of a point cloud geometry; downscaling the representation of the point cloud geometry the number of times to form a downscaled representation of the point cloud geometry; encoding the downscaled representation of the point cloud geometry; and outputting the encoded downscaled representation of the point cloud geometry.

Figure 15:
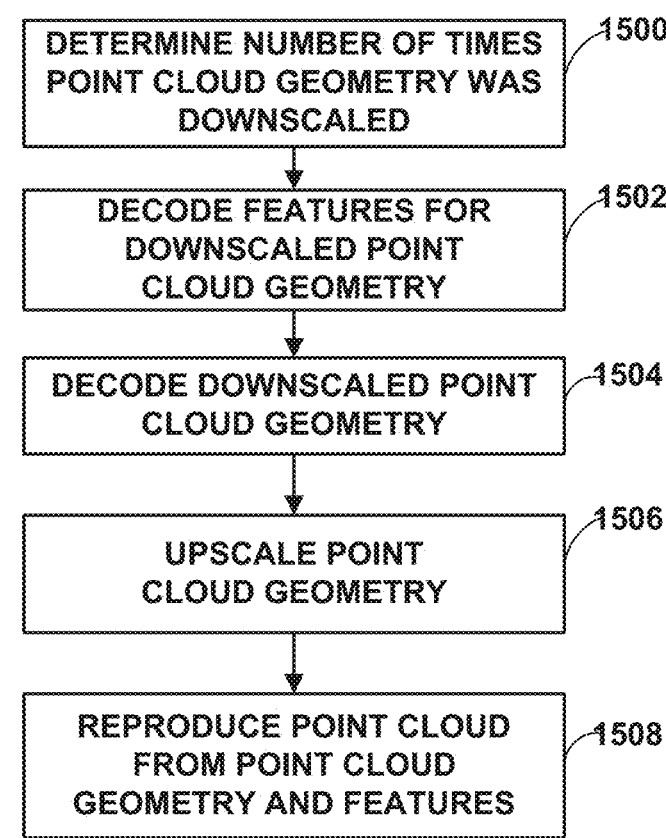
FIG. 15 is a flowchart illustrating an example method of decoding point cloud data according to the techniques of this disclosure.

FIG. 15 is a flowchart illustrating an example method of decoding point cloud data according to the techniques of this disclosure. The method of FIG. 15 is explained with respect to point cloud decoder 300. However, it should be understood that the method of FIG. 15 may also be performed by other devices, such as receiver 404 of FIG. 4, decoder network 504 of FIG. 5, decoder portion 1104 of FIG. 11, or decoder portion 1204 of FIG. 12.

Initially, point cloud decoder 300 may determine a number of times a point cloud geometry was downscaled (1500). The number of times the point cloud geometry was downscaled may correspond to a number of times the point cloud geometry is to be upscaled. Thus, point cloud decoder 300 may additionally or alternatively be configured to determine a number of times the point cloud geometry is to be upscaled. For example, point cloud decoder 300 may decode a value for a syntax element, such as ds_level_minus1, where ds_levelminus1+1 may indicate the number of times the point cloud geometry was downscaled and/or the number of times the point cloud geometry is to be upscaled.

Decoding and upscaling unit 302 of point cloud decoder 300 may then decode the downscaled point cloud geometry (1502) as well as upscale the downscaled point cloud geometry (1504). For example, decoding and upscaling unit 302 may include a series of a sets of units, each set of units including decoding units and an upscaling unit. The number of sets in the series may be equal to the value for the syntax element indicating the number of times the point cloud geometry was downscaled/is to be upscaled. Point cloud decoder 300 may also decode features for the downscaled point cloud geometry (1506). Decoding and upscaling the point cloud geometry may be performed using an AI/ML model for decoding and upscaling point cloud data. In some examples, point cloud decoder 300 may upscale the downscaled point cloud geometry, then use the upscaled point cloud geometry when decoding the features. The features may correspond to, for example, color, reflectance, luminance, surface normals, or the like. Ultimately, point cloud decoder 300 may reproduce the point cloud from the upscaled point cloud geometry and the features (1508), e.g., apply the features to the points of the upscaled point cloud geometry.

In this manner, the method of FIG. 15 represents an example of a method of decoding point cloud data including determining a number of times to upscale a downscaled encoded representation of a point cloud geometry; decoding the downscaled encoded representation of the point cloud geometry; upscaling the representation of the point cloud geometry the number of times to form an upscaled representation of the point cloud geometry; and reproducing a point cloud using the upscaled representation of the point cloud geometry.

Various examples of the techniques of this disclosure are summarized in the following clauses:

Clause 1: A method of encoding point cloud data, the method comprising: determining a number of times to downscale a representation of a point cloud geometry; downscaling the representation of the point cloud geometry the number of times to form a downscaled representation of the point cloud geometry; encoding the downscaled representation of the point cloud geometry; encoding features corresponding to the downscaled representation of the point cloud geometry; and outputting the encoded downscaled representation of the point cloud geometry and the encoded features.

Clause 2: The method of clause 1, wherein determining the number of times to downscale the representation comprises determining the number of times to downscale the representation according to at least one of a use case, bit requirements, or a type of point cloud for the point cloud geometry.

Clause 3: The method of any of clauses 1 and 2, wherein encoding the downscaled representation of the point cloud geometry comprises losslessly encoding the downscaled representation of the point cloud geometry.

Clause 4: The method of any of clauses 1-3, wherein encoding the features comprises encoding the features using lossy encoding.

Clause 5: The method of any of clauses 1-4, wherein encoding the downscaled representation of the point cloud geometry comprises encoding the downscaled representation of the point cloud geometry using one of intra-frame (I-frame) encoding, inter-frame (P-frame) encoding, or bi-directional inter-frame (B-frame) encoding.

Clause 6: The method of any of clauses 1-5, wherein the downscaled representation of the point cloud geometry comprises a downscaled representation of a point cloud geometry for a current frame, and wherein encoding the features comprises: extracting multiscale features from a previously coded frame of point cloud data; forming, by a predictor network, predicted features of the current frame from the extracted multiscale features and the downscaled representation of the point cloud geometry for the current frame; and coding residual data representing differences between features of the current frame and the predicted features of the current frame.

Clause 7: The method of any of clauses 1-6, further comprising encoding data representing the number of times the representation of the point cloud geometry was downscaled.

Clause 8: The method of clause 1, wherein determining the number of times to downscale the representation comprises determining the number of times to downscale the representation according to at least one of a use case, bit requirements, or a type of point cloud for the point cloud geometry.

Clause 9: The method of clause 1, wherein encoding the downscaled representation of the point cloud geometry comprises losslessly encoding the downscaled representation of the point cloud geometry.

Clause 10: The method of clause 1, wherein encoding the features comprises encoding the features using lossy encoding.

Clause 11: The method of clause 1, wherein encoding the downscaled representation of the point cloud geometry comprises encoding the downscaled representation of the point cloud geometry using one of intra-frame (I-frame) encoding, inter-frame (P-frame) encoding, or bi-directional inter-frame (B-frame) encoding.

Clause 12: The method of clause 1, wherein the downscaled representation of the point cloud geometry comprises a downscaled representation of a point cloud geometry for a current frame, and wherein encoding the features comprises: extracting multiscale features from a previously coded frame of point cloud data; forming, by a predictor network, predicted features of the current frame from the extracted multiscale features and the downscaled representation of the point cloud geometry for the current frame; and coding residual data representing differences between features of the current frame and the predicted features of the current frame.

Clause 13: The method of clause 1, further comprising encoding data representing the number of times the representation of the point cloud geometry was downscaled.

Clause 14: A method of decoding point cloud data, the method comprising: determining a number of times to upscale a downscaled encoded representation of a point cloud geometry; decoding the downscaled encoded representation of the point cloud geometry; decoding features corresponding to the downscaled representation of the point cloud geometry; upscaling the representation of the point cloud geometry the number of times to form an upscaled representation of the point cloud geometry; reproducing a point cloud using the upscaled representation of the point cloud geometry and the features; and outputting the reproduced point cloud.

Clause 15: The method of clause 14, wherein determining the number of times to downscale the representation comprises determining the number of times to downscale the representation according to at least one of a use case, bit requirements, or a type of point cloud for the point cloud geometry.

Clause 16: The method of any of clauses 14 and 15, wherein determining the number of times to downscale the representation comprises decoding data representing the number of times the representation of the point cloud geometry was downscaled.

Clause 17: The method of any of clauses 14-16, wherein decoding the downscaled representation of the point cloud geometry comprises decoding the downscaled representation of the point cloud geometry using one of intra-frame (I-frame) decoding, inter-frame (P-frame) decoding, or bi-directional inter-frame (B-frame) decoding.

Clause 18: The method of any of clauses 14-17, wherein the downscaled representation of the point cloud geometry comprises a downscaled representation of a point cloud geometry for a current frame, and wherein decoding the features comprises: extracting multiscale features from a previously decoded frame of point cloud data; forming, by a predictor network, predicted features of the current frame from the extracted multiscale features and the downscaled representation of the point cloud geometry for the current frame; decoding residual data representing differences between original features of the current frame and the predicted features of the current frame; and applying the residual data to the predicted features to reproduce the original features.

Clause 19: The method of clause 14, wherein determining the number of times to downscale the representation comprises determining the number of times to downscale the representation according to at least one of a use case, bit requirements, or a type of point cloud for the point cloud geometry.

Clause 20: The method of clause 14, wherein determining the number of times to downscale the representation comprises decoding data representing the number of times the representation of the point cloud geometry was downscaled.

Clause 21: The method of clause 14, wherein decoding the downscaled representation of the point cloud geometry comprises decoding the downscaled representation of the point cloud geometry using one of intra-frame (I-frame) decoding, inter-frame (P-frame) decoding, or bi-directional inter-frame (B-frame) decoding.

Clause 22: The method of clause 14, wherein the downscaled representation of the point cloud geometry comprises a downscaled representation of a point cloud geometry for a current frame, and wherein decoding the features comprises: extracting multiscale features from a previously decoded frame of point cloud data; forming, by a predictor network, predicted features of the current frame from the extracted multiscale features and the downscaled representation of the point cloud geometry for the current frame; decoding residual data representing differences between original features of the current frame and the predicted features of the current frame; and applying the residual data to the predicted features to reproduce the original features.

Clause 23: The method of clause 14, wherein upscaling the representation of the point cloud geometry the number of times further comprises pruning false voxels and extracting true occupied voxels using binary classification after each upscaling.

Clause 24: The method of clause 14, further comprising encoding the downscaled representation of the point cloud geometry and the features prior to decoding the downscaled representation of the point cloud geometry and the features.

Clause 25: The method of any of clauses 14-18, further comprising encoding the downscaled representation of the point cloud geometry and the features prior to decoding the downscaled representation of the point cloud geometry and the features.

Clause 26: A device for coding point cloud data, the device comprising one or more means for performing the method of any of clauses 1-25.

Clause 27: The device of clause 26, wherein the one or more means comprise one or more processors implemented in circuitry.

Clause 28: The device of any of clauses 26 and 27, further comprising a display configured to display the decoded video data.

Clause 29: The device of any of clauses 26-28, wherein the device comprises one or more of a camera, a computer, a mobile device, a broadcast receiver device, or a set-top box.

Clause 30: The device of clause 26-29, further comprising a memory configured to store the point cloud data.

Clause 31: A computer-readable storage medium having stored thereon instructions that, when executed, cause a processor to perform the method of any of clauses 1-25.

Clause 32: A method of encoding point cloud data, the method comprising: determining a number of times to downscale a representation of a point cloud geometry; downscaling the representation of the point cloud geometry the number of times to form a downscaled representation of the point cloud geometry; encoding the downscaled representation of the point cloud geometry; and outputting the encoded downscaled representation of the point cloud geometry.

Clause 33: The method of clause 32, wherein determining the number of times to downscale the representation comprises determining the number of times to downscale the representation according to at least one of a use case, bit requirements, or a type of point cloud for the point cloud geometry.

Clause 34: The method of clause 32, wherein encoding the downscaled representation of the point cloud geometry comprises losslessly encoding the downscaled representation of the point cloud geometry.

Clause 35: The method of clause 32, further comprising encoding features corresponding to the downscaled representation of the point cloud geometry using lossy encoding.

Clause 36: The method of clause 32, wherein encoding the downscaled representation of the point cloud geometry comprises encoding the downscaled representation of the point cloud geometry using one of intra-frame (I-frame) encoding, inter-frame (P-frame) encoding, or bi-directional inter-frame (B-frame) encoding.

Clause 37: The method of clause 32, wherein the downscaled representation of the point cloud geometry comprises a downscaled representation of a point cloud geometry for a current frame, and wherein encoding the features comprises: extracting multiscale features from a previously coded frame of point cloud data; forming, by a predictor network, predicted features of the current frame from the extracted multiscale features and the downscaled representation of the point cloud geometry for the current frame; and coding residual data representing differences between features of the current frame and the predicted features of the current frame.

Clause 38: The method of clause 32, further comprising encoding data representing the number of times the representation of the point cloud geometry was downscaled.

Clause 39: The method of clause 32, wherein downscaling the representation of the point cloud geometry and encoding the downscaled representation comprises executing a neural network trained to downscale and encode the point cloud geometry in a number of stages equal to the number of times to downscale the representation of the point cloud geometry, each stage including a downscaling step and an encoding portion.

Clause 40: The method of clause 32, wherein downscaling the representation of the point cloud geometry and encoding the downscaled representation comprises executing a neural network trained to downscale the point cloud geometry in a number of stages equal to the number of times to downscale the representation of the point cloud geometry, each stage including a downscaling step, and to then encode the downscaled representation of the point cloud geometry.

Clause 41: A device for encoding point cloud data, the device comprising: a memory configured to store point cloud data; and one or more processors implemented in circuitry and configured to: determine a number of times to downscale a representation of a point cloud geometry; downscale the representation of the point cloud geometry the number of times to form a downscaled representation of the point cloud geometry; encode the downscaled representation of the point cloud geometry; and output the encoded downscaled representation of the point cloud geometry.

Clause 42: The device of clause 41, wherein to determine the number of times to downscale the representation, the one or more processors are configured to determine the number of times to downscale the representation according to at least one of a use case, bit requirements, or a type of point cloud for the point cloud geometry.

Clause 43: The device of clause 41, wherein to encode the downscaled representation of the point cloud geometry, the one or more processors are configured to losslessly encode the downscaled representation of the point cloud geometry.

Clause 44: The device of clause 41, wherein the one or more processors are further configured to encode features corresponding to the downscaled representation of the point cloud geometry using lossy encoding.

Clause 45: The device of clause 41, wherein to encode the downscaled representation of the point cloud geometry, the one or more processors are configured to encode the downscaled representation of the point cloud geometry using one of intra-frame (I-frame) encoding, inter-frame (P-frame) encoding, or bi-directional inter-frame (B-frame) encoding.

Clause 46: The device of clause 41, wherein the downscaled representation of the point cloud geometry comprises a downscaled representation of a point cloud geometry for a current frame, and wherein to encode the features, the one or more processors are configured to: extract multiscale features from a previously coded frame of point cloud data; execute a predictor network to form predicted features of the current frame from the extracted multiscale features and the downscaled representation of the point cloud geometry for the current frame; and code residual data representing differences between features of the current frame and the predicted features of the current frame.

Clause 47: The device of clause 41, wherein the one or more processors are further configured to encode data representing the number of times the representation of the point cloud geometry was downscaled.

Clause 48: The device of clause 41, wherein to downscale the representation of the point cloud geometry and to encode the downscaled representation, the one or more processors are configured to execute a neural network trained to downscale and encode the point cloud geometry in a number of stages equal to the number of times to downscale the representation of the point cloud geometry, each stage including a downscaling step and an encoding portion.

Clause 49: The device of clause 41, wherein to downscale the representation of the point cloud geometry and to encode the downscaled representation, the one or more processors are configured to execute a neural network trained to downscale the point cloud geometry in a number of stages equal to the number of times to downscale the representation of the point cloud geometry, each stage including a downscaling step, and to then encode the downscaled representation of the point cloud geometry.

Clause 50: A device for encoding point cloud data, the device comprising: means for determining a number of times to downscale a representation of a point cloud geometry; means for downscaling the representation of the point cloud geometry the number of times to form a downscaled representation of the point cloud geometry; means for encoding the downscaled representation of the point cloud geometry; and means for outputting the encoded downscaled representation of the point cloud geometry.

Clause 51: A method of decoding point cloud data, the method comprising: determining a number of times to upscale a downscaled encoded representation of a point cloud geometry; decoding the downscaled encoded representation of the point cloud geometry; upscaling the downscaled representation of the point cloud geometry the number of times to form an upscaled representation of the point cloud geometry; and reproducing a point cloud using the upscaled representation of the point cloud geometry.

Clause 52: The method of clause 51, wherein determining the number of times to upscale the downscaled representation comprises determining the number of times to upscale the downscaled representation according to at least one of a use case, bit requirements, or a type of point cloud for the point cloud geometry.

Clause 53: The method of clause 51, wherein determining the number of times to upscale the downscaled representation comprises decoding data representing the number of times the representation of the point cloud geometry was downscaled.

Clause 54: The method of clause 51, wherein decoding the downscaled representation of the point cloud geometry comprises decoding the downscaled representation of the point cloud geometry using one of intra-frame (I-frame) decoding, inter-frame (P-frame) decoding, or bi-directional inter-frame (B-frame) decoding.

Clause 55: The method of clause 51, wherein the downscaled representation of the point cloud geometry comprises a downscaled representation of a point cloud geometry for a current frame, the method further comprising decoding features corresponding to the downscaled representation of the point cloud geometry, including: extracting multiscale features from a previously decoded frame of point cloud data; forming, by a predictor network, predicted features of the current frame from the extracted multiscale features and the downscaled representation of the point cloud geometry for the current frame; decoding residual data representing differences between original features of the current frame and the predicted features of the current frame; and applying the residual data to the predicted features to reproduce the original features.

Clause 56: The method of clause 51, wherein upscaling the representation of the point cloud geometry the number of times further comprises pruning false voxels and extracting true occupied voxels using binary classification after each upscaling.

Clause 57: The method of clause 51, wherein decoding the downscaled representation of the point cloud geometry and upscaling the representation comprises executing a neural network trained to decode and upscale the point cloud geometry in a number of stages equal to the number of times to upscale the representation of the point cloud geometry, each stage including a decoding step and an upscaling portion.

Clause 58: The method of clause 51, wherein decoding the downscaled representation of the point cloud geometry and upscaling the downscaled representation comprises executing a neural network trained to decode the representation of the point cloud geometry and then upscale the point cloud geometry in a number of stages equal to the number of times to upscale the representation of the point cloud geometry.

Clause 59: A device for decoding point cloud data, the device comprising: a memory configured to store point cloud data; and one or more processors implemented in circuitry and configured to: determine a number of times to upscale a downscaled encoded representation of a point cloud geometry; decode the downscaled encoded representation of the point cloud geometry; upscale the representation of the point cloud geometry the number of times to form an upscaled representation of the point cloud geometry; and reproduce a point cloud using the upscaled representation of the point cloud geometry.

Clause 60: The device of clause 59, wherein to determine the number of times to upscale the downscaled representation, the one or more processors are configured to determine the number of times to upscale the downscaled representation according to at least one of a use case, bit requirements, or a type of point cloud for the point cloud geometry.

Clause 61: The device of clause 59, wherein to determine the number of times to upscale the downscaled representation, the one or more processors are configured to decode data representing the number of times the representation of the point cloud geometry was downscaled.

Clause 62: The device of clause 59, wherein to decode the downscaled representation of the point cloud geometry, the one or more processors are configured to decode the downscaled representation of the point cloud geometry using one of intra-frame (I-frame) decoding, inter-frame (P-frame) decoding, or bi-directional inter-frame (B-frame) decoding.

Clause 63: The device of clause 59, wherein the representation of the point cloud geometry comprises a downscaled representation of a point cloud geometry for a current frame, and wherein to decode the downscaled representation of the point cloud geometry, the one or more processors are configured to: extract multiscale features from a previously decoded frame of point cloud data; execute a predictor network to form predicted features of the current frame from the extracted multiscale features and the downscaled representation of the point cloud geometry for the current frame; decode residual data representing differences between original features of the current frame and the predicted features of the current frame; and apply the residual data to the predicted features to reproduce the original features.

Clause 64: The device of clause 59, wherein to upscale the representation of the point cloud geometry the number of times, the one or more processors are configured to prune false voxels and extracting true occupied voxels using binary classification after each upscaling.

Clause 65: The device of clause 59, wherein to decode the downscaled representation of the point cloud geometry and to upscale the representation, the one or more processors are configured to execute a neural network trained to decode and upscale the point cloud geometry in a number of stages equal to the number of times to upscale the representation of the point cloud geometry, each stage including a decoding step and an upscaling portion.

Clause 66: The device of clause 59, wherein to decode the downscaled representation of the point cloud geometry and to upscale the downscaled representation, the one or more processors are configured to execute a neural network trained to decode the representation of the point cloud geometry and then upscale the point cloud geometry in a number of stages equal to the number of times to upscale the representation of the point cloud geometry.

Clause 67: A device for decoding point cloud data, the device comprising: means for determining a number of times to upscale a downscaled encoded representation of a point cloud geometry; means for decoding the downscaled encoded representation of the point cloud geometry; means for upscaling the downscaled representation of the point cloud geometry the number of times to form an upscaled representation of the point cloud geometry; and means for reproducing a point cloud using the upscaled representation of the point cloud geometry.

Clause 68: A method of encoding point cloud data, the method comprising: determining a number of times to downscale a representation of a point cloud geometry; downscaling the representation of the point cloud geometry the number of times to form a downscaled representation of the point cloud geometry; encoding the downscaled representation of the point cloud geometry; and outputting the encoded downscaled representation of the point cloud geometry.

Clause 69: The method of clause 68, wherein determining the number of times to downscale the representation comprises determining the number of times to downscale the representation according to at least one of a use case, bit requirements, or a type of point cloud for the point cloud geometry.

Clause 70: The method of any of clauses 68 and 69, wherein encoding the downscaled representation of the point cloud geometry comprises losslessly encoding the downscaled representation of the point cloud geometry.

Clause 71: The method of any of clauses 68-70, further comprising encoding features corresponding to the downscaled representation of the point cloud geometry using lossy encoding.

Clause 72: The method of any of clauses 68-71, wherein encoding the downscaled representation of the point cloud geometry comprises encoding the downscaled representation of the point cloud geometry using one of intra-frame (I-frame) encoding, inter-frame (P-frame) encoding, or bi-directional inter-frame (B-frame) encoding.

Clause 73: The method of any of clauses 68-72, wherein the downscaled representation of the point cloud geometry comprises a downscaled representation of a point cloud geometry for a current frame, and wherein encoding the features comprises: extracting multiscale features from a previously coded frame of point cloud data; forming, by a predictor network, predicted features of the current frame from the extracted multiscale features and the downscaled representation of the point cloud geometry for the current frame; and coding residual data representing differences between features of the current frame and the predicted features of the current frame.

Clause 74: The method of any of clauses 68-73, further comprising encoding data representing the number of times the representation of the point cloud geometry was downscaled.

Clause 75: The method of any of clauses 68-74, wherein downscaling the representation of the point cloud geometry and encoding the downscaled representation comprises executing a neural network trained to downscale and encode the point cloud geometry in a number of stages equal to the number of times to downscale the representation of the point cloud geometry, each stage including a downscaling step and an encoding portion.

Clause 76: The method of any of clauses 68-74, wherein downscaling the representation of the point cloud geometry and encoding the downscaled representation comprises executing a neural network trained to downscale the point cloud geometry in a number of stages equal to the number of times to downscale the representation of the point cloud geometry, each stage including a downscaling step, and to then encode the downscaled representation of the point cloud geometry.

Clause 77: A device for encoding point cloud data, the device comprising: a memory configured to store point cloud data; and one or more processors implemented in circuitry and configured to: determine a number of times to downscale a representation of a point cloud geometry; downscale the representation of the point cloud geometry the number of times to form a downscaled representation of the point cloud geometry; encode the downscaled representation of the point cloud geometry; and output the encoded downscaled representation of the point cloud geometry.

Clause 78: The device of clause 77, wherein to determine the number of times to downscale the representation, the one or more processors are configured to determine the number of times to downscale the representation according to at least one of a use case, bit requirements, or a type of point cloud for the point cloud geometry.

Clause 79: The device of any of clauses 77 and 78, wherein to encode the downscaled representation of the point cloud geometry, the one or more processors are configured to losslessly encode the downscaled representation of the point cloud geometry.

Clause 80: The device of any of clauses 77-79, wherein the one or more processors are further configured to encode features corresponding to the downscaled representation of the point cloud geometry using lossy encoding.

Clause 81: The device of any of clauses 77-80, wherein to encode the downscaled representation of the point cloud geometry, the one or more processors are configured to encode the downscaled representation of the point cloud geometry using one of intra-frame (I-frame) encoding, inter-frame (P-frame) encoding, or bi-directional inter-frame (B-frame) encoding.

Clause 82: The device of any of clauses 77-81, wherein the downscaled representation of the point cloud geometry comprises a downscaled representation of a point cloud geometry for a current frame, and wherein to encode the features, the one or more processors are configured to: extract multiscale features from a previously coded frame of point cloud data; execute a predictor network to form predicted features of the current frame from the extracted multiscale features and the downscaled representation of the point cloud geometry for the current frame; and code residual data representing differences between features of the current frame and the predicted features of the current frame.

Clause 83: The device of any of clauses 77-82, wherein the one or more processors are further configured to encode data representing the number of times the representation of the point cloud geometry was downscaled.

Clause 84: The device of any of clauses 77-83, wherein to downscale the representation of the point cloud geometry and to encode the downscaled representation, the one or more processors are configured to execute a neural network trained to downscale and encode the point cloud geometry in a number of stages equal to the number of times to downscale the representation of the point cloud geometry, each stage including a downscaling step and an encoding portion.

Clause 85: The device of any of clauses 77-83, wherein to downscale the representation of the point cloud geometry and to encode the downscaled representation, the one or more processors are configured to execute a neural network trained to downscale the point cloud geometry in a number of stages equal to the number of times to downscale the representation of the point cloud geometry, each stage including a downscaling step, and to then encode the downscaled representation of the point cloud geometry.

Clause 86: A device for encoding point cloud data, the device comprising: means for determining a number of times to downscale a representation of a point cloud geometry; means for downscaling the representation of the point cloud geometry the number of times to form a downscaled representation of the point cloud geometry; means for encoding the downscaled representation of the point cloud geometry; and means for outputting the encoded downscaled representation of the point cloud geometry.

Clause 87: A method of decoding point cloud data, the method comprising: determining a number of times to upscale a downscaled encoded representation of a point cloud geometry; decoding the downscaled encoded representation of the point cloud geometry; upscaling the downscaled representation of the point cloud geometry the number of times to form an upscaled representation of the point cloud geometry; and reproducing a point cloud using the upscaled representation of the point cloud geometry.

Clause 88: The method of clause 87, wherein determining the number of times to upscale the downscaled representation comprises determining the number of times to upscale the downscaled representation according to at least one of a use case, bit requirements, or a type of point cloud for the point cloud geometry.

Clause 89: The method of any of clauses 87 and 88, wherein determining the number of times to upscale the downscaled representation comprises decoding data representing the number of times the representation of the point cloud geometry was downscaled.

Clause 90: The method of any of clauses 87-89, wherein decoding the downscaled representation of the point cloud geometry comprises decoding the downscaled representation of the point cloud geometry using one of intra-frame (I-frame) decoding, inter-frame (P-frame) decoding, or bi-directional inter-frame (B-frame) decoding.

Clause 91: The method of any of clauses 87-90, wherein the downscaled representation of the point cloud geometry comprises a downscaled representation of a point cloud geometry for a current frame, the method further comprising decoding features corresponding to the downscaled representation of the point cloud geometry, including: extracting multiscale features from a previously decoded frame of point cloud data; forming, by a predictor network, predicted features of the current frame from the extracted multiscale features and the downscaled representation of the point cloud geometry for the current frame; decoding residual data representing differences between original features of the current frame and the predicted features of the current frame; and applying the residual data to the predicted features to reproduce the original features.

Clause 92: The method of any of clauses 87-91, wherein upscaling the representation of the point cloud geometry the number of times further comprises pruning false voxels and extracting true occupied voxels using binary classification after each upscaling.

Clause 93: The method of any of clauses 87-92, wherein decoding the downscaled representation of the point cloud geometry and upscaling the representation comprises executing a neural network trained to decode and upscale the point cloud geometry in a number of stages equal to the number of times to upscale the representation of the point cloud geometry, each stage including a decoding step and an upscaling portion.

Clause 94: The method of any of clauses 87-92, wherein decoding the downscaled representation of the point cloud geometry and upscaling the downscaled representation comprises executing a neural network trained to decode the representation of the point cloud geometry and then upscale the point cloud geometry in a number of stages equal to the number of times to upscale the representation of the point cloud geometry.

Clause 95: A device for decoding point cloud data, the device comprising: a memory configured to store point cloud data; and one or more processors implemented in circuitry and configured to: determine a number of times to upscale a downscaled encoded representation of a point cloud geometry; decode the downscaled encoded representation of the point cloud geometry; upscale the representation of the point cloud geometry the number of times to form an upscaled representation of the point cloud geometry; and reproduce a point cloud using the upscaled representation of the point cloud geometry.

Clause 96: The device of clause 95, wherein to determine the number of times to upscale the downscaled representation, the one or more processors are configured to determine the number of times to upscale the downscaled representation according to at least one of a use case, bit requirements, or a type of point cloud for the point cloud geometry.

Clause 97: The device of any of clauses 95 and 96, wherein to determine the number of times to upscale the downscaled representation, the one or more processors are configured to decode data representing the number of times the representation of the point cloud geometry was downscaled.

Clause 98: The device of any of clauses 95-97, wherein to decode the downscaled representation of the point cloud geometry, the one or more processors are configured to decode the downscaled representation of the point cloud geometry using one of intra-frame (I-frame) decoding, inter-frame (P-frame) decoding, or bi-directional inter-frame (B-frame) decoding.

Clause 99: The device of any of clauses 95-98, wherein the representation of the point cloud geometry comprises a downscaled representation of a point cloud geometry for a current frame, and wherein to decode the downscaled representation of the point cloud geometry, the one or more processors are configured to: extract multiscale features from a previously decoded frame of point cloud data; execute a predictor network to form predicted features of the current frame from the extracted multiscale features and the downscaled representation of the point cloud geometry for the current frame; decode residual data representing differences between original features of the current frame and the predicted features of the current frame; and apply the residual data to the predicted features to reproduce the original features.

Clause 100: The device of any of clauses 95-99, wherein to upscale the representation of the point cloud geometry the number of times, the one or more processors are configured to prune false voxels and extracting true occupied voxels using binary classification after each upscaling.

Clause 101: The device of any of clauses 95-100, wherein to decode the downscaled representation of the point cloud geometry and to upscale the representation, the one or more processors are configured to execute a neural network trained to decode and upscale the point cloud geometry in a number of stages equal to the number of times to upscale the representation of the point cloud geometry, each stage including a decoding step and an upscaling portion.

Clause 102: The device of any of clauses 95-100, wherein to decode the downscaled representation of the point cloud geometry and to upscale the downscaled representation, the one or more processors are configured to execute a neural network trained to decode the representation of the point cloud geometry and then upscale the point cloud geometry in a number of stages equal to the number of times to upscale the representation of the point cloud geometry.

Clause 103: A device for decoding point cloud data, the device comprising: means for determining a number of times to upscale a downscaled encoded representation of a point cloud geometry; means for decoding the downscaled encoded representation of the point cloud geometry; means for upscaling the downscaled representation of the point cloud geometry the number of times to form an upscaled representation of the point cloud geometry; and means for reproducing a point cloud using the upscaled representation of the point cloud geometry.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding point cloud data, the method comprising:
   determining a number of times to downscale a representation of a point cloud geometry;
   downscaling the representation of the point cloud geometry the number of times to form a downscaled representation of the point cloud geometry;
   encoding the downscaled representation of the point cloud geometry;

forming encoding data representing the number of times the representation of the point cloud geometry was downscaled; and outputting the encoded downscaled representation of the point cloud geometry and the encoded data representing the number of times the representation of the point cloud geometry was downscaled.

2. The method of claim 1, wherein determining the number of times to downscale the representation comprises determining the number of times to downscale the representation according to at least one of a use case, bit requirements, or a type of point cloud for the point cloud geometry.

3. The method of claim 1, wherein encoding the downscaled representation of the point cloud geometry comprises losslessly encoding the downscaled representation of the point cloud geometry.

4. The method of claim 1, further comprising encoding features corresponding to the downscaled representation of the point cloud geometry using lossy encoding.

5. The method of claim 1, wherein encoding the downscaled representation of the point cloud geometry comprises encoding the downscaled representation of the point cloud geometry using one of intra-frame (I-frame) encoding, inter-frame (P-frame) encoding, or bi-directional inter-frame (B-frame) encoding.

6. The method of claim 1, wherein the downscaled representation of the point cloud geometry comprises a downscaled representation of a point cloud geometry for a current frame, the method further comprising encoding features corresponding to the downscaled representation of the point cloud geometry, comprising:

extracting multiscale features from a previously coded frame of point cloud data;

forming, by a predictor network, predicted features of the current frame from the extracted multiscale features and the downscaled representation of the point cloud geometry for the current frame; and coding residual data representing differences between features of the current frame and the predicted features of the current frame.

7. The method of claim 1, wherein downscaling the representation of the point cloud geometry and encoding the downscaled representation comprises executing a neural network trained to downscale and encode the point cloud geometry in a number of stages equal to the number of times to downscale the representation of the point cloud geometry, each stage including a downscaling step and an encoding portion.

8. The method of claim 1, wherein downscaling the representation of the point cloud geometry and encoding the downscaled representation comprises executing a neural network trained to downscale the point cloud geometry in a number of stages equal to the number of times to downscale the representation of the point cloud geometry, each stage including a downscaling step, and to then encode the downscaled representation of the point cloud geometry.

9. A device for encoding point cloud data, the device comprising:

a memory configured to store point cloud data; and one or more processors implemented in circuitry and configured to:

determine a number of times to downscale a representation of a point cloud geometry;

downscale the representation of the point cloud geometry the number of times to form a downscaled representation of the point cloud geometry;

encode the downscaled representation of the point cloud geometry;

form encoding data representing the number of times the representation of the point cloud geometry was downscaled; and output the encoded downscaled representation of the point cloud geometry and the encoded data representing the number of times the representation of the point cloud geometry was downscaled.

10. The device of claim 9, wherein to determine the number of times to downscale the representation, the one or more processors are configured to determine the number of times to downscale the representation according to at least one of a use case, bit requirements, or a type of point cloud for the point cloud geometry.

11. The device of claim 9, wherein to encode the downscaled representation of the point cloud geometry, the one or more processors are configured to losslessly encode the downscaled representation of the point cloud geometry.

12. The device of claim 9, wherein the one or more processors are further configured to encode features corresponding to the downscaled representation of the point cloud geometry using lossy encoding.

13. The device of claim 9, wherein to encode the downscaled representation of the point cloud geometry, the one or more processors are configured to encode the downscaled representation of the point cloud geometry using one of intra-frame (I-frame) encoding, inter-frame (P-frame) encoding, or bi-directional inter-frame (B-frame) encoding.

14. The device of claim 9, wherein the downscaled representation of the point cloud geometry comprises a downscaled representation of a point cloud geometry for a current frame, and wherein the one or more processors are further configured to encode features corresponding to the point cloud geometry, wherein to encode the features, the one or more processors are configured to:

extract multiscale features from a previously coded frame of point cloud data;

execute a predictor network to form predicted features of the current frame from the extracted multiscale features and the downscaled representation of the point cloud geometry for the current frame; and code residual data representing differences between features of the current frame and the predicted features of the current frame.

15. The device of claim 9, wherein to downscale the representation of the point cloud geometry and to encode the downscaled representation, the one or more processors are configured to execute a neural network trained to downscale and encode the point cloud geometry in a number of stages equal to the number of times to downscale the representation of the point cloud geometry, each stage including a downscaling step and an encoding portion.

16. The device of claim 9, wherein to downscale the representation of the point cloud geometry and to encode the downscaled representation, the one or more processors are configured to execute a neural network trained to downscale the point cloud geometry in a number of stages equal to the number of times to downscale the representation of the point cloud geometry, each stage including a downscaling step, and to then encode the downscaled representation of the point cloud geometry.

17. A device for encoding point cloud data, the device comprising:

means for determining a number of times to downscale a representation of a point cloud geometry;

means for downscaling the representation of the point cloud geometry the number of times to form a downscaled representation of the point cloud geometry;

means for encoding the downscaled representation of the point cloud geometry;

means for forming encoded data representing the number of times the representation of the point cloud geometry was downscaled; and means for outputting the encoded downscaled representation of the point cloud geometry and the encoded data representing the number of times the representation of the point cloud geometry was downscaled.

\* \* \* \* \*